United States Patent
Straub et al.

(10) Patent No.: US 10,419,514 B2
(45) Date of Patent: Sep. 17, 2019

(54) DISCOVERY OF FEDERATED LOGINS

(71) Applicant: Oracle International Corporation, Redwood Shores, CA (US)

(72) Inventors: Christian David Straub, Palo Alto, CA (US); Maneesh Chugh, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/002,803

(22) Filed: Jan. 21, 2016

(65) Prior Publication Data

US 2017/0048252 A1 Feb. 16, 2017

Related U.S. Application Data

(60) Provisional application No. 62/205,270, filed on Aug. 14, 2015.

(51) Int. Cl.
*H04L 29/08* (2006.01)
*H04W 12/06* (2009.01)
*H04W 12/00* (2009.01)

(52) U.S. Cl.
CPC .............. *H04L 67/02* (2013.01); *H04L 67/06* (2013.01); *H04L 67/10* (2013.01);
(Continued)

(58) Field of Classification Search
CPC ......... H04L 67/02; H04L 67/06; H04L 67/10; H04W 12/06
See application file for complete search history.

(56) References Cited

U.S. PATENT DOCUMENTS

| 5,550,971 A | 8/1996 | Brunner et al. |
| 6,058,389 A | 5/2000 | Chandra et al. |

(Continued)

FOREIGN PATENT DOCUMENTS

WO 2016049626 A1 3/2016

OTHER PUBLICATIONS

Shiraz et al., A Review on Distributed Application Processing Frameworks in Smart Mobile Devices for Mobile Cloud Computing; 2013 vol. 15, Issue 3, IEEE Communications Surveys & Tutorials, pp. 1294-1313 (Year: 2013).*

(Continued)

*Primary Examiner* — Luu T Pham
*Assistant Examiner* — Harvey I Cohen
(74) *Attorney, Agent, or Firm* — Potomac Law Group, PLLC

(57) ABSTRACT

A system includes download location information in an unprotected Uniform Resource Locator ("URL"), where the download location information identifies a download location for downloading an application provided by a cloud system. The system further includes login server information in the unprotected URL, where the login server information identifies a login server that is configured to be logged in before downloading the application from the download location. Based on the unprotected URL, the application is configured to be downloaded on a mobile device from the download location and after logging into the login server. The application may be developed by accessing a web-based application development server in the cloud system, and after the application is developed, the web-based application development server generates the unprotected URL.

20 Claims, 13 Drawing Sheets

(52) U.S. Cl.
CPC ....... *H04W 12/0023* (2019.01); *H04W 12/06* (2013.01); *H04W 12/00522* (2019.01)

(56) References Cited

U.S. PATENT DOCUMENTS

| | | | |
|---|---|---|---|
| 6,097,382 A | 8/2000 | Rosen et al. | |
| 6,115,715 A | 9/2000 | Traversat et al. | |
| 6,266,058 B1 | 7/2001 | Meyer | |
| 6,631,497 B1 | 10/2003 | Jamshidi et al. | |
| 6,631,519 B1 | 10/2003 | Nicholson et al. | |
| 6,813,244 B1 | 11/2004 | He et al. | |
| 6,990,653 B1 | 1/2006 | Burd et al. | |
| 7,062,502 B1 | 6/2006 | Kesler | |
| 7,111,307 B1 | 9/2006 | Wang | |
| 7,116,310 B1 | 10/2006 | Evans et al. | |
| 7,203,678 B1 | 4/2007 | Petropoulos et al. | |
| 7,206,805 B1 | 4/2007 | McLaughlin | |
| 7,337,434 B2 | 2/2008 | Nichols et al. | |
| 7,395,355 B2 | 7/2008 | Afergan et al. | |
| 7,428,725 B2 | 9/2008 | Niyogi et al. | |
| 7,430,732 B2 | 9/2008 | Cwalina et al. | |
| 7,464,297 B2 | 12/2008 | Potter, IV et al. | |
| 7,546,576 B2 | 6/2009 | Egli | |
| 7,546,602 B2 | 6/2009 | Hejlsberg et al. | |
| 7,577,909 B2 | 8/2009 | Harriger et al. | |
| 7,577,934 B2 | 8/2009 | Anonsen et al. | |
| 7,610,575 B2 | 10/2009 | Sproule | |
| 7,650,594 B2 | 1/2010 | Nattinger | |
| 7,707,553 B2 | 4/2010 | Rogues et al. | |
| 7,730,427 B2 | 6/2010 | Peters | |
| 7,735,068 B2 | 6/2010 | Siddarampappa et al. | |
| 7,757,177 B1 | 7/2010 | Bohm et al. | |
| 7,757,207 B2 | 7/2010 | Yan et al. | |
| 7,769,810 B1 | 8/2010 | Kaufman | |
| 7,779,383 B2 | 8/2010 | Bornhoevd et al. | |
| 7,802,294 B2 | 9/2010 | Perlin et al. | |
| 7,818,718 B2 | 10/2010 | Wedel et al. | |
| 7,849,447 B1 | 12/2010 | Karis et al. | |
| 7,861,121 B2 | 12/2010 | Wang | |
| 7,917,888 B2 | 3/2011 | Chong et al. | |
| 7,926,027 B2 | 4/2011 | Chen et al. | |
| 7,937,364 B2 | 5/2011 | Chandrasekaran et al. | |
| 8,032,634 B1 | 10/2011 | Eppstein et al. | |
| 8,166,387 B2 | 4/2012 | Morrison et al. | |
| 8,219,970 B2 | 7/2012 | Neil et al. | |
| 8,364,968 B2 | 1/2013 | Corcoran et al. | |
| 8,417,728 B1 | 4/2013 | Anders et al. | |
| 8,452,567 B1 | 5/2013 | Sullivan et al. | |
| 8,578,282 B2 | 11/2013 | Boillot | |
| 8,612,933 B1 | 12/2013 | Gill et al. | |
| 8,676,723 B2 | 3/2014 | Jung | |
| 8,745,641 B1 | 6/2014 | Coker | |
| 8,812,546 B1 | 8/2014 | Cornali | |
| 8,813,028 B2 | 8/2014 | Farooqi | |
| 8,843,450 B1 | 9/2014 | Shioyama et al. | |
| 8,924,355 B1 | 12/2014 | Kundzich et al. | |
| 8,949,776 B2 | 2/2015 | Feber | |
| 8,954,553 B1 | 2/2015 | Colton et al. | |
| 8,954,732 B1 | 2/2015 | Watsen et al. | |
| 8,972,929 B2 | 3/2015 | Fahmy | |
| 8,977,693 B2 | 3/2015 | Gidugu | |
| 8,984,581 B2 | 3/2015 | Luna et al. | |
| 8,990,765 B2 | 3/2015 | Kulkarni et al. | |
| 9,047,166 B2 | 6/2015 | Nishio et al. | |
| 9,047,404 B1 | 6/2015 | Jibaly et al. | |
| 9,047,414 B1 | 6/2015 | Matyjek | |
| 9,054,919 B2* | 6/2015 | Kiang | H04L 29/0854 |
| 9,069,375 B2 | 6/2015 | Padmavilasom | |
| 9,077,770 B2 | 7/2015 | Redpath | |
| 9,105,046 B1 | 8/2015 | Dias et al. | |
| 9,158,518 B2 | 10/2015 | Brown et al. | |
| 9,223,684 B2 | 12/2015 | Gittelman et al. | |
| 9,258,668 B2 | 2/2016 | Mall et al. | |
| 9,258,669 B2 | 2/2016 | Nyisztor et al. | |
| 9,292,502 B2 | 3/2016 | Karlsen | |
| 9,448,790 B2 | 9/2016 | Collison et al. | |
| 9,536,080 B2 | 1/2017 | Kerr et al. | |
| 9,772,822 B2 | 9/2017 | Narayanan et al. | |
| 9,772,987 B2 | 9/2017 | Davis et al. | |
| 9,826,045 B2 | 11/2017 | Straub et al. | |
| 9,992,268 B2 | 6/2018 | Atsatt et al. | |
| 10,048,948 B2 | 8/2018 | Davis et al. | |
| 10,073,825 B2 | 9/2018 | Davis et al. | |
| 2002/0129175 A1 | 9/2002 | Banavar et al. | |
| 2002/0174010 A1* | 11/2002 | Rice, III | G06F 17/30194 |
| | | | 705/14.67 |
| 2003/0177282 A1 | 9/2003 | Hejlsberg et al. | |
| 2004/0010621 A1 | 1/2004 | Afergan et al. | |
| 2004/0034616 A1 | 2/2004 | Witkowski et al. | |
| 2004/0046789 A1 | 3/2004 | Inanoria | |
| 2004/0073565 A1 | 4/2004 | Kaufman et al. | |
| 2004/0133876 A1 | 7/2004 | Sproule | |
| 2004/0205149 A1 | 10/2004 | Dillon et al. | |
| 2004/0240444 A1 | 12/2004 | Matthews et al. | |
| 2004/0250257 A1 | 12/2004 | Koutyrine et al. | |
| 2005/0172261 A1 | 8/2005 | Yuknewicz et al. | |
| 2005/0183059 A1 | 8/2005 | Loksh et al. | |
| 2005/0273759 A1 | 12/2005 | Lucassen et al. | |
| 2006/0048097 A1 | 3/2006 | Doshi | |
| 2006/0112123 A1 | 5/2006 | Clark et al. | |
| 2006/0112398 A1 | 5/2006 | Mukkamala et al. | |
| 2006/0173951 A1 | 8/2006 | Arteaga et al. | |
| 2006/0174334 A1 | 8/2006 | Perlin et al. | |
| 2006/0206890 A1 | 9/2006 | Shenfield et al. | |
| 2006/0230078 A1 | 10/2006 | McConaughy et al. | |
| 2006/0236302 A1 | 10/2006 | Bateman et al. | |
| 2006/0291398 A1 | 12/2006 | Potter, IV et al. | |
| 2006/0294333 A1 | 12/2006 | Michaylov et al. | |
| 2007/0016804 A1 | 1/2007 | Kemshall | |
| 2007/0067313 A1 | 3/2007 | Garza et al. | |
| 2007/0190978 A1 | 8/2007 | White et al. | |
| 2007/0219956 A1 | 9/2007 | Milton | |
| 2007/0240127 A1 | 10/2007 | Rogues et al. | |
| 2007/0288887 A1 | 12/2007 | Pepin et al. | |
| 2008/0046462 A1 | 2/2008 | Kaufman et al. | |
| 2008/0082569 A1 | 4/2008 | Mansour et al. | |
| 2008/0215637 A1 | 9/2008 | Barnes et al. | |
| 2008/0222238 A1 | 9/2008 | Ivanov et al. | |
| 2008/0256554 A1 | 10/2008 | Yassin | |
| 2008/0276224 A1 | 11/2008 | Gyure et al. | |
| 2009/0006538 A1 | 1/2009 | Risney, Jr. et al. | |
| 2009/0064001 A1 | 3/2009 | Robbins | |
| 2009/0077477 A1 | 3/2009 | Khan et al. | |
| 2009/0106323 A1 | 4/2009 | Wong et al. | |
| 2009/0157811 A1 | 6/2009 | Bailor et al. | |
| 2009/0172085 A1 | 7/2009 | Arthursson | |
| 2009/0172519 A1 | 7/2009 | Xu et al. | |
| 2009/0183072 A1 | 7/2009 | Stephenson et al. | |
| 2009/0222749 A1 | 9/2009 | Marinescu et al. | |
| 2009/0282096 A1 | 11/2009 | Kamrowski et al. | |
| 2010/0017812 A1 | 1/2010 | Nigam | |
| 2010/0070230 A1 | 3/2010 | Kumar et al. | |
| 2010/0138778 A1 | 6/2010 | Dewan et al. | |
| 2010/0161714 A1 | 6/2010 | Dongre | |
| 2010/0257230 A1 | 10/2010 | Kroeger et al. | |
| 2010/0281475 A1 | 11/2010 | Jain et al. | |
| 2010/0293080 A1 | 11/2010 | Shah | |
| 2011/0041006 A1 | 2/2011 | Fowler | |
| 2011/0107196 A1 | 5/2011 | Foster | |
| 2011/0107246 A1 | 5/2011 | Vik | |
| 2011/0123973 A1 | 5/2011 | Singh | |
| 2011/0125448 A1 | 5/2011 | Jung | |
| 2011/0191407 A1 | 8/2011 | Fu et al. | |
| 2011/0246922 A1 | 10/2011 | Koenig et al. | |
| 2011/0246964 A1 | 10/2011 | Cox, III et al. | |
| 2011/0265077 A1 | 10/2011 | Collison et al. | |
| 2011/0302516 A1 | 12/2011 | White et al. | |
| 2011/0307524 A1 | 12/2011 | Aitken et al. | |
| 2011/0314159 A1 | 12/2011 | Murphy et al. | |
| 2012/0005192 A1 | 1/2012 | Bao et al. | |
| 2012/0023193 A1 | 1/2012 | Eisner et al. | |
| 2012/0036125 A1 | 2/2012 | Al-Kofahi et al. | |
| 2012/0089610 A1 | 4/2012 | Agrawal et al. | |
| 2012/0090021 A1 | 4/2012 | Luh et al. | |

(56) References Cited

U.S. PATENT DOCUMENTS

| | | |
|---|---|---|
| 2012/0102451 A1 | 4/2012 | Kulkarni et al. |
| 2012/0136926 A1 | 5/2012 | Dillon |
| 2012/0252405 A1* | 10/2012 | Lortz .................. G06F 8/60 455/410 |
| 2012/0254405 A1 | 10/2012 | Ganesh et al. |
| 2012/0290940 A1 | 11/2012 | Quine |
| 2012/0317172 A1 | 12/2012 | Redpath |
| 2012/0317233 A1 | 12/2012 | Redpath |
| 2012/0323553 A1 | 12/2012 | Aslam et al. |
| 2013/0019242 A1 | 1/2013 | Chen et al. |
| 2013/0024695 A1 | 1/2013 | Kandrasheu et al. |
| 2013/0031459 A1 | 1/2013 | Khorashadi et al. |
| 2013/0066837 A1 | 3/2013 | Colrain et al. |
| 2013/0097660 A1* | 4/2013 | Das .................. H04L 63/10 726/1 |
| 2013/0117238 A1 | 5/2013 | Gower |
| 2013/0151848 A1 | 6/2013 | Baumann et al. |
| 2013/0159405 A1 | 6/2013 | Nalliah et al. |
| 2013/0166507 A1 | 6/2013 | Staczek |
| 2013/0254262 A1 | 9/2013 | Udall |
| 2013/0262626 A1* | 10/2013 | Bozek .................. H04L 67/10 709/217 |
| 2013/0297661 A1 | 11/2013 | Jagota |
| 2014/0007205 A1* | 1/2014 | Oikonomou ........... G06F 21/35 726/6 |
| 2014/0013109 A1 | 1/2014 | Yin |
| 2014/0039887 A1* | 2/2014 | Dzik .................. G10L 15/26 704/235 |
| 2014/0040789 A1 | 2/2014 | Munter et al. |
| 2014/0047413 A1 | 2/2014 | Sheive et al. |
| 2014/0053056 A1 | 2/2014 | Weber et al. |
| 2014/0053126 A1 | 2/2014 | Watson et al. |
| 2014/0082715 A1* | 3/2014 | Grajek .................. H04L 63/083 726/8 |
| 2014/0095874 A1* | 4/2014 | Desai .................. H04L 63/0815 713/168 |
| 2014/0108492 A1 | 4/2014 | Garza et al. |
| 2014/0109072 A1 | 4/2014 | Lang et al. |
| 2014/0109078 A1* | 4/2014 | Lang .................. G06F 8/52 717/172 |
| 2014/0173454 A1 | 6/2014 | Sanchez |
| 2014/0258969 A1 | 9/2014 | Brown et al. |
| 2014/0258970 A1 | 9/2014 | Brown et al. |
| 2014/0280009 A1 | 9/2014 | Hage |
| 2014/0280771 A1 | 9/2014 | Bosworth et al. |
| 2014/0281943 A1 | 9/2014 | Prilepov et al. |
| 2014/0282398 A1 | 9/2014 | Podolyak et al. |
| 2014/0282399 A1 | 9/2014 | Gorelik et al. |
| 2014/0298293 A1 | 10/2014 | Nishio et al. |
| 2014/0304507 A1 | 10/2014 | Coppola et al. |
| 2015/0039732 A1 | 2/2015 | Mall et al. |
| 2015/0040104 A1 | 2/2015 | Mall et al. |
| 2015/0040201 A1 | 2/2015 | Nyisztor et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089351 A1 | 3/2015 | Logan et al. |
| 2015/0128063 A1 | 5/2015 | Jones |
| 2015/0128106 A1 | 5/2015 | Halley et al. |
| 2015/0154415 A1 | 6/2015 | Wu et al. |
| 2015/0163301 A1 | 6/2015 | Narayanan |
| 2015/0229638 A1 | 8/2015 | Loo |
| 2015/0319252 A1 | 11/2015 | Momchilov et al. |
| 2015/0326640 A1 | 11/2015 | Jellick et al. |
| 2015/0373068 A1 | 12/2015 | Allen et al. |
| 2016/0004668 A1 | 1/2016 | Rowles et al. |
| 2016/0004729 A1 | 1/2016 | Evans |
| 2016/0048848 A1 | 2/2016 | Diggs et al. |
| 2016/0057220 A1 | 2/2016 | Gibbs et al. |
| 2016/0085666 A1 | 3/2016 | Jordan |
| 2016/0085735 A1 | 3/2016 | Davis et al. |
| 2016/0085793 A1 | 3/2016 | Davis et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0154629 A1 | 6/2016 | Noens et al. |
| 2016/0203087 A1 | 7/2016 | Nam et al. |
| 2016/0342478 A1 | 11/2016 | Fryc |
| 2016/0342678 A1 | 11/2016 | Newman et al. |
| 2016/0350529 A1 | 12/2016 | Kerr et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0083293 A1 | 3/2017 | Jao et al. |
| 2017/0083503 A1 | 3/2017 | Davis et al. |

OTHER PUBLICATIONS

Czauski et al., NERD-NoEffortRapidDevelopmentFrameworkForProvisioningMobileCloudApplications, 2014 2nd IEEE International Conf Mobile Cloud Computing, Services, and Engineering, 2014, pp. 57-66 (Year: 2014).*

Jana et al., ManagementOfSecurityAndPrivacyIssuesApplicationDevelopmentMobileCloudEnvironment, 2014, International Conference on Recent Advances and Innovations in Engineering (ICRAIE-2014), pp. 1-6 (Year: 2014).*

Giray et al., "Systematic Approach for Mapping Software Development Methods to the Essence Framework", ACM, pp. 26-32, 2016.

Hudli et al. "An Evaluation Framework for Selection of Mobile App Development Platform", ACM, pp. 13-16, 2015.

Boushehrinejadmoradi, "Testing Cross-Platform Mobile App Development Frameworks", IEEE, Jan. 2016, pp. 441-451; http://ieeexplore.ieee.org/stamp/stamp.jsp?tp=&arnumber=7372032.

Cascaval et al., "ZOOMM: A Parallel Web Browser Engine for Multicore Mobile Devices" ACM, pp. 271-280, 2013.

Cheng, "Virtual Browser for Enabling Multi-device Web Applications", ACM, pp. 1-6, 2012.

Choi et al., "Designing a High-Performance Mobile Cloud Web Browser", ACM, pp. 735-736, 2014.

El-Kassas et al., "Taxonomy of Cross-Platform Mobile Applications Development Approaches", Elsevier, Oct. 2015, pp. 163-190; http://www.sciencedirect.com/science/article/pii/S2090447915001276.

Gaouar et al., Model Driven Approaches to Cross Platform Mobile Development, ACM, IPAC'15, Nov. 2015, pp. 1-5; http://dl.acm.org/citation.cfm?id=2816882&CFID=802186845&CFTOKEN=79626257.

Zucker et al., "Implementing Device UI in Standards-based Markup", ACM 173-176, 2006.

Grossman et al., "ToolClips: An Investigation of Contextual Video Assistance for Functionality Understanding, CHI 2010: Looking with Video", Apr. 10-15, 2010, pp. 1515-1524.

Saleh et al., "Pro JSF and HTML5—Building Rich Internet Components", 2nd edition, Apress, 2013, pp. 1.-384.

Zambon; "Beginning JSP, JSF and Tomcat—Java Web Development"; Apress; Chapters 4-7; 2012.

Unknown, "Oracle Database Mobile Server Developer's Guide Release 11.1.0 E22677-03", Sep. 2011, 266 pages.

* cited by examiner

DISCOVERY OF FEDERATED LOGINS

CROSS-REFERENCE TO RELATED APPLICATIONS

This application claims priority of U.S. Provisional App. No. 62/205,270 filed Aug. 14, 2015, entitled "DISCOVERY OF FEDERATED LOGINS," the disclosure of which is hereby incorporated by reference.

FIELD

One embodiment is directed generally to an application development system, and in particular, to a mobile application development system.

BACKGROUND INFORMATION

Generally, ubiquitous mobile services and wireless connections drive the demand for mobile device applications (commonly referred to as "apps") for various personal and business needs. Such demand in turn leads to the desirability of mobile application development platforms/means that simplify and expedite mobile application development and modification, while also allowing for sophisticated application features and ensuring that business security is not compromised.

SUMMARY

One embodiment is a system that includes download location information in an unprotected Uniform Resource Locator ("URL"), where the download location information identifies a download location for downloading an application provided by a cloud system. The system further includes login server information in the unprotected URL, where the login server information identifies a login server that is configured to be logged in before downloading the application from the download location. Based on the unprotected URL, the application is configured to be downloaded on a mobile device from the download location and after logging into the login server. The application may be developed by accessing a web-based application development server in the cloud system, and after the application is developed, the web-based application development server generates the unprotected URL.

DETAILED DESCRIPTION

Figure 1:
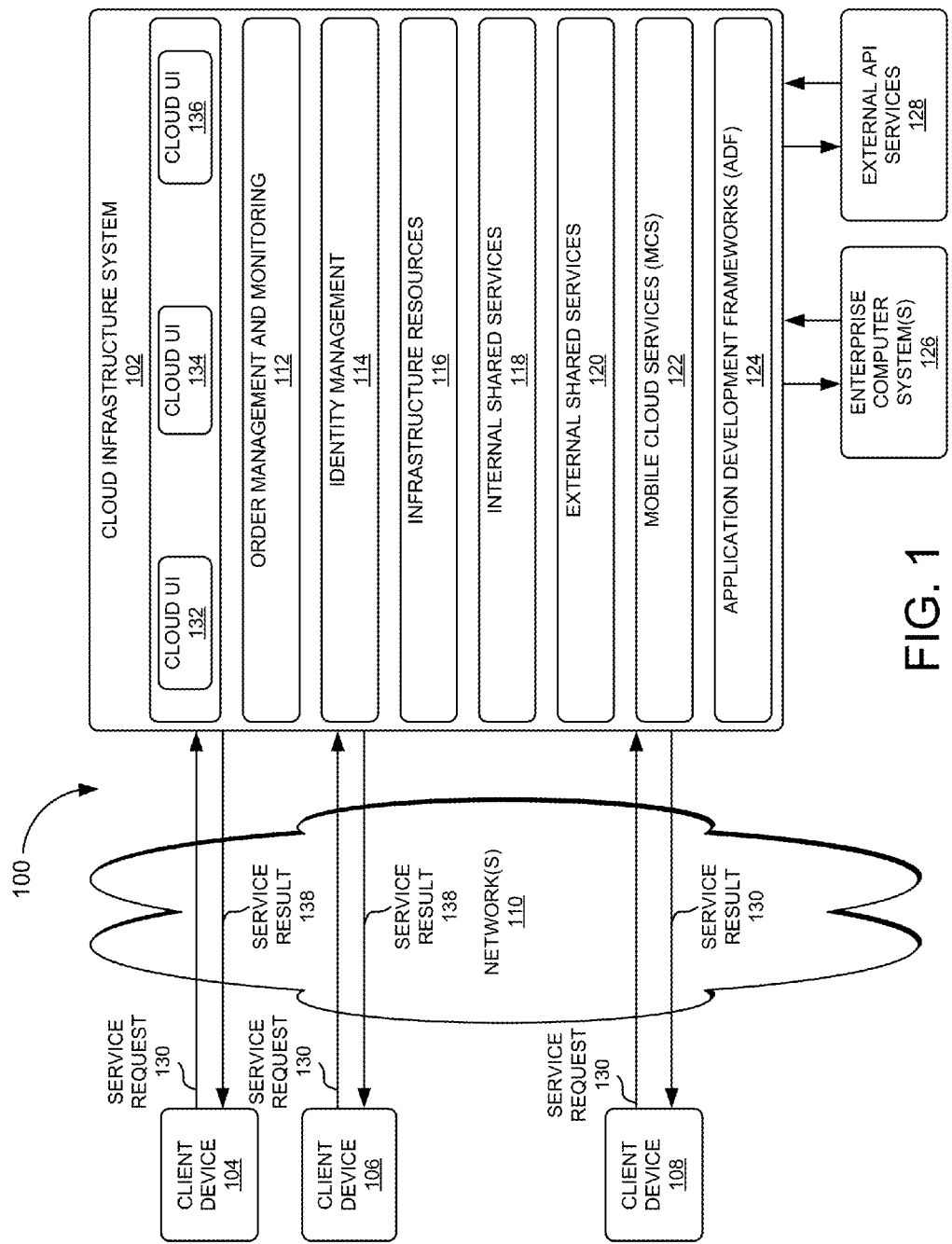
FIG. 1 is a block diagram of a system for developing applications that use mobile cloud services, in accordance with an embodiment of the present invention.

An application refers to a software program, which on execution performs specific desired tasks. In general, several applications are executed in a run-time environment containing one or more operating systems ("OSs"), virtual machines (e.g., supporting Java™ programming language), device drivers, etc. Developers often use Application Development Frameworks ("ADFs") (which are by themselves applications) for implementing/developing desired applications. An ADF provides a set of pre-defined code/data modules that can be directly/indirectly used in the development of an application. An ADF is an example of an integrated development environment ("IDE") that can include code generators, debuggers, etc. In general, an ADF simplifies application development by providing re-usable components which can be used by application developers to define user interfaces ("UIs") and application logic by, for example, selecting components to perform desired tasks and defining the appearance, behavior, and interactions of the selected components. Some ADFs, such as "Oracle ADF" from Oracle Corp., are based on a model-view-controller ("MVC") design pattern that promotes loose coupling and easier application development and maintenance.

Generally, many companies have expressed the need to allow their employees to access secure enterprise applications with mobile devices from off-site locations, so that on-the-go employees can access information that is stored on enterprise computer systems. With such capabilities, salespeople may work from the road, service technicians may look up parts while at a customer site, employees may work from home, etc. Some companies would also like to allow end customers to access data located in enterprise computer systems. Such access may differentiate a company from competitors by improving the customer experience and lowering costs. For example, by implementing such access, a store may allow customers to remotely search store inventory for an item and shop whenever convenient, thereby improving customer experience and lowering the need for salespeople, operators, and other staff.

Different enterprise application vendors have traditionally fulfilled this need by offering specialized portals in combination with either company owned secure mobile devices or custom mobile applications. However, with the current explosion in the variety of available personal mobile devices, these traditional solutions quickly become obsolete since vendors simply cannot keep up with all the latest OSs and hardware that become available.

Further, an application may need to connect and synchronize with different enterprise computer systems depending on the application type and/or the type of data used by the application. These enterprise computer systems may be supported by different backend computer systems which may also vary based on application type and data type. However, different backend enterprise systems may use different communication protocols and mechanisms to communicate data to devices, thereby causing mobile computing devices that run a variety of applications to encounter challenges for communicating with different backend computer systems that support an enterprise computer system.

Yet further, security may become a concern in allowing access to internal computer systems of an enterprise. The differences in communication protocols supported between the mobile computing devices and the enterprise computer systems may further complicate security access management for communications between mobile computing devices and enterprise computer systems. For example, different mechanisms may be implemented to ensure authentication of an application to access a particular enterprise computer system that has a proprietary security protocol. Some known systems have attempted to address this issues by connecting off-the-shelf consumer mobile devices with backend enterprise systems of companies. These devices may be configured with applications or OSs that connect to an enterprise network through special portals dedicated to communication with enterprise backend computer systems. However, manufacturers of mobile devices, application developers, and enterprises may benefit from more flexible and robust techniques for developing applications and connecting mobile devices to enterprise backend computer systems.

In contrast to the known systems, embodiments of the present invention provide a declarative browser based client application development tool for rapid business user friendly mobile application composition in a "cloud" service. In one embodiment, the cloud service is "Mobile Cloud Service" ("MCS") from Oracle Corp. Embodiments allow for building mobile applications using pre-defined templates that use the cloud service for backend services, so that a service definition can be presented to a developer during application development to allow for rapid connection between UI design and backend services.

MCS

In embodiments that use MCS, MCS facilitates communication between a mobile computing device and enterprise computer systems via a cloud computer system. MCS uses a third party cloud based interface between mobile devices and an enterprise network of a company. The cloud based interface centralizes secure adaptors for various enterprise computer systems, and translates different protocols to a standardized Representational State Transfer ("REST") architecture. Companies can use embodiments of the present invention to create their own custom mobile applications using available tools on MCS, and such applications can be downloaded in native form onto mobile user devices. Once an application is installed, it can access the cloud based interface of MCS to reach various enterprise computer systems through the secure adaptors provided by MCS.

For application development in embodiments that use MCS, MCS provides backend services under the Mobile Backend as a Service ("MBaaS," also referred to as "BaaS") model. MBaaS allows Web and mobile application developers to link their applications to backend cloud storage and APIs exposed by backend applications while also providing user management, push notifications, integration with social networking services, etc. By using backend services provided in MCS under the MBaaS model, embodiments provide a declarative Web-based UI configured for mobile application development by non-technical users with no familiarity with coding.

In one embodiment, a wizard is launched when a user starts developing a new application, and the user is asked to give a name and description for the new application. Then, the user is asked to design the first page of the application by selecting from a set of pre-defined templates (e.g., tabs, bottom tabs, pagination, etc.) that can pre-seed the UI for the first page. The UI is then completed by specifying details in the template, while a preview is automatically updated to show the changes. Upon completing the UI design, the user can use a palette to browse a catalog of available services and data sources that are available to the mobile application through MCS (e.g., a service catalog). For each item of the catalog that is added to the UI, the user is presented with a list of attributes, and using one or more gestures (e.g., drag and drop, etc.) the user can bind the attributes to UI elements. The user can repeat the process of feature definition and data-binding to create a mobile application. Other UI components such as maps, graphs, etc., can also be added to the UI. When the application is ready for testing, the user may publish the application so that corresponding binaries are created (building native executables for iOS, Android, or any other mobile device OS), and a Quick Response ("QR") code is subsequently generated and provided to the user. If the user scans the QR code by a mobile device, the application is installed over the air onto the mobile device.

Embodiments use pre-built components in an ADF. The components offer data interaction, data visualization, and encapsulated browser side operations, and simplify rich client application development. ADF may also implement a plugin such as Apache Cordova plugin to access device features such as a camera, Global Positioning System ("GPS"), contacts, etc.

In one embodiment, when an ADF receives a request to build an application for a mobile device, it determines portions of one or more already developed applications that have been precompiled using a toolkit, and modifies declarative information associated with those existing applications. This embodiment then builds the requested application based on the modified declarative information and one or more binary artifacts of the existing applications by packaging the binary artifacts representing the requested application for a desired operating system ("OS," such as iOS, Android, etc.). The ADF then compiles the requested application to generate one or more binary artifacts and a set of definition files. In end-user development, an artifact is an application or a complex data object that is created by an end-user without the need to know a programming language.

Mobile Security

Some embodiments use security services provided by a mobile security suite such as "Oracle Mobile Security Suite" ("OMSS") from Oracle Corp. OMSS is a mobile device and mobile application security solution that provides an employee-centric, comprehensive Enterprise Mobility Management ("EMM") solution and a consumer-centric mobile and social service. EMM provides mobile device management ("MDM"), mobile application management ("MAM"), mobile content management ("MCM"), and mobile identity policies by seamlessly tying to existing user identities and leveraging advanced features of the enterprise backend identity management infrastructure for mobile access. Security policies, adhering to corporate needs, can be defined to enforce a complete device lock down (typically for corporate owned devices) and/or to separate personal applications from secure "containerized" corporate applications and data (for bring your own device ("BYOD") cases). A mobile and social service provides a software development kit ("SDK") allowing corporate developers to secure custom enterprise applications for iOS and Android devices, bridging the gap between mobile devices, social networks, and enterprise backend identity management infrastructure.

OMSS delivers a secure container to a mobile device for application and content security to separate, protect, and wipe corporate applications and data. All communication between the mobile device and enterprise intranet resources goes through an authenticated transport layer security ("TLS")/secure socket layer ("SSL") tunnel ("AppTunnel") that can only be used by vetted (or "containerized") applications of the mobile device. The AppTunnel is terminated at a Mobile Security Access Server located at the corporate demilitarized zone ("DMZ"). This server offers secure Intranet access to mobile devices and terminates only the AppTunnel from the secure container, thereby lessening the risk of rogue applications and the need for device level VPN.

Leveraging what is provided by an ADF, embodiments provide browser based application development, which does not require coding and which easily maps to business services. Embodiments also allow for previewing an application inline (e.g., as the application is being developed), as well as editing, testing, and publishing an application from a browser. Accordingly, instead of an IDE such as "Jdeveloper" from Oracle Corp. that is configured for use by professional developers, embodiments are configured for use by business users (e.g., non-technical users).

Service Catalog

To support embodiments of the present invention that use MCS, MCS provides access to an API catalog such as "Oracle API Catalog" ("OAC") from Oracle Corp. OAC provides visibility to available APIs in an organization so those APIs may be reused for application development. OAC includes a simple metamodel for an API asset, automation to populate OAC with APIs, and the ability for users to search OAC for APIs and understand the details of the APIs to assess their fit in their applications. OAC includes a harvester that creates API assets in OAC. In some embodiments, harvesting is performed at build time of projects. The harvester introspects deployed services and creates API assets representing services discovered in the project such as service oriented architecture ("SOA") Services and Service Bus proxies, Web Services Description Language ("WSDL") based Web services, and Web Application Description Language ("WADL") based REST services. The created assets are collected in OAC.

After the API assets are created by the harvester, curators edit the API assets using a simple editor to provide additional metadata to facilitate the discovery and understanding of the APIs. Curators can change the name, add a description, tag keywords, or add document references to the API assets in OAC. This metadata simplifies discovery and understanding of each API asset by a user. After the API metadata is edited, curators publish the API by making it visible to users in OAC. Published assets are available in the OAC console and via the Oracle JDeveloper Oracle Enterprise Repository plug-in. Users can search OAC to discover APIs and review the metadata provided by the curator to learn more about an API.

Each OAC user is assigned a role which determines which OAC features and content are available for each user. There are predefined roles in OAC including developer, curator, and admin. Users with the developer role have the ability to search OAC for published APIs, examine the API metadata to better understand the API, declare interest in the API, and submit ratings and reviews for an API. In addition to the capabilities available to the developer role, users with the curator role can run the harvester to create new API assets in OAC, edit the APIs to update their metadata, and publish them. In addition to the capabilities available to curators and developers, users with the admin role have access to an Admin page in OAC to administer the infrastructure of OAC by editing system settings, creating new users, creating new departments, managing sessions, and using the import/export tool. Admins can also configure security features included with OAC.

In some embodiments, an application may be developed and deployed to a mobile device as either a native application or a hosted application. For native application deployment, a complete application is installed on the device. For hosted application development, a user needs to download a hosting application from an "app store," where such hosting application "hosts" the hosted applications that will be installed as "features" onto the hosting application. This embodiment may allow for updating a running hosting application from a server, such that declarative metadata can be sent to the device and overlaid on top of the existing application to update the application to run against this new metadata.

FIG. 1 is a block diagram of a system environment 100 for developing applications by using pre-defined templates that allow for use of MCS 122 as backend services. A service definition can be presented to a user during application development allowing rapid connection between UI design and backend services.

In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a Web browser, a proprietary client application (e.g., Oracle Forms), or some other application, which may be used by a user of the client computing device to interact with cloud infrastructure system 102 to use services provided by cloud infrastructure system 102.

Cloud infrastructure system 102 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile OSs such as iOS, Windows Phone, Android, BlackBerry 10, Palm OS, and the like, and being Internet, e-mail, short message service ("SMS"), Blackberry®, or other communication protocol enabled. Client computing devices 104, 106, and 108 can be general purpose personal computers including, by way of example, personal computers and/or laptop computers running various versions of Microsoft Windows®, Apple Macintosh®, and/or Linux OSs. Client computing devices 104, 106, and 108 can be workstation computers running any of a variety of commercially-available UNIX® or UNIX-like OSs, including without limitation the variety of GNU/Linux OSs, such as for example, Google Chrome OS. Alternatively, or in addition, client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc., may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation transmission control protocol/Internet protocol ("TCP/IP"), systems network architecture ("SNA"), Internet packet exchange ("IPX"), AppleTalk, etc. Merely by way of example, network(s) 110 can be a local area network ("LAN"), such as one based on Ethernet, Token-Ring and/or the like. Network(s) 110 can be a wide-area network and the Internet. It can include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Cloud infrastructure system 102 may comprise one or more computers and/or servers. These computer systems or servers may be composed of one or more general purpose computers, specialized server computers (including, by way of example, personal computer ("PC") servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an OS including any of those discussed above, as well as any commercially available server OS. One or more computer systems or servers associated with cloud infrastructure system 102 may also run any of a variety of additional server applications and/or mid-tier applications, including hypertext transport protocol ("HTTP") servers, file transfer protocol ("FTP") servers, common gateway interface ("CGI") servers, JAVA® servers, database servers, and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted Web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a Web service-based hosted relational database and a script-language middleware engine for private use by a networked developer. As another example, a service instance instantiated by cloud infrastructure 102 can include access to an email software application hosted on a cloud vendor's Web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is "Oracle Public Cloud" from Oracle Corp.

Cloud infrastructure system 102 may provide the cloud services via different deployment models. For example, services may be provided under a public cloud model in which cloud infrastructure system 102 is owned by an organization selling cloud services (e.g., owned by Oracle Corp.) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under software as a service ("SaaS") category, platform as a service ("PaaS") category, infrastructure as a service ("IaaS") category, MBaaS category, or other categories of services including hybrid services. In some embodiments, the services provided by cloud infrastructure system 102 may include, without limitation, application services, platform services, infrastructure services, backend services, etc. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, "Oracle Java Cloud Service" ("JCS") from Oracle Corp., "Oracle Database Cloud Service" ("DBCS") from Oracle Corp., and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, IaaS, and MBaaS services) in the cloud infrastructure system. In one embodiment, cloud management functionality may include capabilities for provisioning, managing and tracking a customer's subscription received by cloud infrastructure system 102, and the like. In various embodiments, cloud infrastructure system 102 may be adapted to automatically provision, manage and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In exemplary operation, a customer using client computing devices 104, 106 or 108, may interact with cloud infrastructure system 102 by requesting one or more services provided by cloud infrastructure system 102. The customer may issue service request 134 cloud infrastructure system 102 using a variety of means. Service request 134 may include placing an order for a subscription for one or more services offered by cloud infrastructure system 102, accessing one or more services offered by cloud infrastructure system 102, or the like. In certain embodiments, the customer may access a cloud UI 132, 134, 138, and place a subscription order via these UIs. The order information received by cloud infrastructure system 102 in response to the customer placing an order may include information identifying the customer and one or more services offered by the cloud infrastructure system 102 to which the customer intends to subscribe. After an order has been placed by the customer, the order information is received via cloud UIs, 132, 134, and/or 138.

In this example, order management and monitoring module 112 sends information received from a customer to an order database to have the order placed by the customer stored. The order database can be one of several databases operated by cloud infrastructure system 102 and operated in conjunction with other system elements. Order management and monitoring module 112 may forward information that includes all or part of the order information stored in the order database to an order management module. In some instances, the order management module may be configured to perform billing and accounting functions related to the order, such as verifying the order, and upon verification, booking the order.

In certain embodiments, cloud infrastructure system 100 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information can include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources to execute the services provided by the PaaS platform and the SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 120 may include one or more components that provide access, data transformation, automation, or the like to enterprise computer system(s) 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface ("API") services 128 that are shared by different components or modules of cloud infrastructure system 102 and by the services provided by cloud infrastructure system 102. These external API services 128 may include, without limitation, APIs provided by other third party services or entities.

Various different mobile cloud services may be provided by MCS 122 in cloud infrastructure system 102. MCS 122 facilitates communication between a mobile computing device and enterprise computer systems (e.g., enterprise computer systems 124 and 126) according to some embodiments of the present invention. MCS 122 may include one or more memory storage devices ("local storage") used to store enterprise data and authentication information. Enterprise data may be received from enterprise computer systems 126 or from client computing devices 104, 106, or 108 or may include enterprise data converted by cloud infrastructure system 102, or combinations thereof. Authentication information may be received from identity management system 116 and/or generated by cloud infrastructure system 102. In some embodiments, authentication information may include information indicating security authentication of a user with regard to a request for a service.

Enterprise computer systems, such as enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MCS 122 may include an agent system to handle communication with enterprise computer systems 126.

A protocol may include a communication protocol, such as SPeeDY ("SPDY"). A protocol may include an application protocol such as an HTTP-based protocol. In some embodiments, enterprise computer systems 126 may communicate with cloud infrastructure system 102 using a communication protocol such as REST or Simple Object Access Protocol ("SOAP"). For example, REST protocol may support a formats including uniform resource identifier ("URI") or uniform resource locator ("URL"). Enterprise Data formatted for communication using REST protocol may be easily converted to data formats such as JavaScript Object Notation ("JSON"), comma-separated values ("CSV"), and really simple syndication ("RSS"). Enterprise computer systems 126 and cloud infrastructure system 102 may communicate using other protocols such as remote procedure calls ("RPC") (e.g., extended markup language ("XML") RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108 may each implement an application that can provide specific UIs to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an API. Callable interfaces associated with MCS 122 may enable an application on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers can connect to MCS 122 for their custom applications. In some embodiments, a callable interface associated with MCS 122 may be configured by the same person that develops an app, such that the person can implement a custom application to communicate with MCS 122.

Callable interfaces associated with MCS 122 may further enable enterprise computer systems 126 to communicate with MCS 122 according to a standardized protocol or format. Similar to application developers, those who manage enterprise computer systems can implement code (e.g., an agent system) that is configured to communicate with MCS 122 via one or more callable interfaces. Callable interfaces associated with MCS 122 may be implemented based on a type of a computing device, a type of enterprise computer systems, an app, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108 to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an application (e.g., launching an application), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 116 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

ADF

Various different ADFs 124 may be provided in cloud infrastructure system 102. ADFs 124 provide the infrastructure code to implement agile SOA based applications. ADFs 124 further provide a visual and declarative approach to development through one or more development tools (e.g., "Oracle JDeveloper 11g" development tool). One or more frameworks provided by ADFs 124 may implement an MVC design pattern. Such frameworks offer an integrated solution that covers all the layers of the MVC architecture with solutions to such areas as Object/Relational mapping, data persistence, reusable controller layer, rich Web UI framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the UI, making the application extremely agile. Additionally, the developer creating the UI does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 124 to create modules forming enterprise applications. The enterprise applications can be executed within the context of cloud infrastructure system 102. In various embodiments, developers interact with ADFs 124 to create modules forming mobile applications. The mobile applications can be executed within the context of cloud infrastructure system 102. Features of the present invention described below may be implemented using any desired combination of programming language and application development framework as will be apparent to one skilled in the relevant arts by reading the disclosure provided herein.

One or more frameworks provided by ADFs 124 may be embodied as Oracle ADF in one example. Accordingly, a framework in ADFs 124 can be based on an MVC design pattern. An MVC application is separated into: 1) a model layer that handles interaction with data-sources and runs the business logic, 2) a view layer that handles the application UI, and 3) a controller that manages the application flow and acts as the interface between the Model and the View layers. Separating applications into these three layers simplifies maintenance and reuse of components across applications. The independence of each layer from the others results in a loosely coupled, SOA.

In various embodiments, ADFs 124 provide tools and resources allowing developers to create an application in the form of multiple layers, each layer containing code modules/files implementing desired logic according to pre-defined specification. Thus, in one embodiment, ADFS 124 enables the application to be developed as four layers: a view layer containing code modules/files that provide the UI of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 124 let developers choose the technology they prefer to use when implementing each of the layers. Enterprise JavaBean ("EJB"), Web Services, JavaBeans, JPA/EclipseLink/TopLink objects, and many others can all be used as Business Services for ADFs 124. View layers can include Web based interfaces implemented with Java Server Faces ("JSF"), Desktop Swing applications and Microsoft Office front ends, as well as interfaces for mobile devices.

In one aspect, the view layer represents the UI of the application being developed. The view layer can include desktop, mobile, and browser-based views, each of which provides all or a portion of the UI and is accessible in a variety of manners corresponding to view type. For example, Web pages may be sent by the application in response to receiving client requests containing corresponding URLs. The Web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as Web pages) may be implemented using one or more of hypertext markup language ("HTML"), Java server pages ("JSP"), and JSF. Alternatively, the UI may be implemented using Java components such as Swing, and/or XML. As further noted, the UI may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the Web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific Web pages to be displayed when links in another Web page are clicked/ selected by the user, the page to be displayed when errors occur during execution, indicating the specific data to be stored/retrieved, etc.

In one aspect, the controller layer manages the application's flow and handles user input. For example, when a Search button is clicked on a page, the controller determines what action to perform (do a search) and where to navigate to (the results page). There are two controller options for Web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired Web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications. Each abstract data object of the model layer provides a corresponding interface that can be used to access any type of business service executing in an underlying business service layer. The data objects may abstract the business service implementation details of a service from a client and/or expose data control methods/attributes to view components, thus providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasize the use of the declarative programming paradigm throughout the development process to allow users to focus on the logic of application creation without having to get into implementation details. At a high level, the development process for a Fusion Web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using a unified modeling language ("UML") modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, Web services, etc.

Business components represent a business service implemented using, for example, "Oracle ADF Business Components" from Oracle Corp., to provide interaction with databases, Web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplify the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Figure 2:
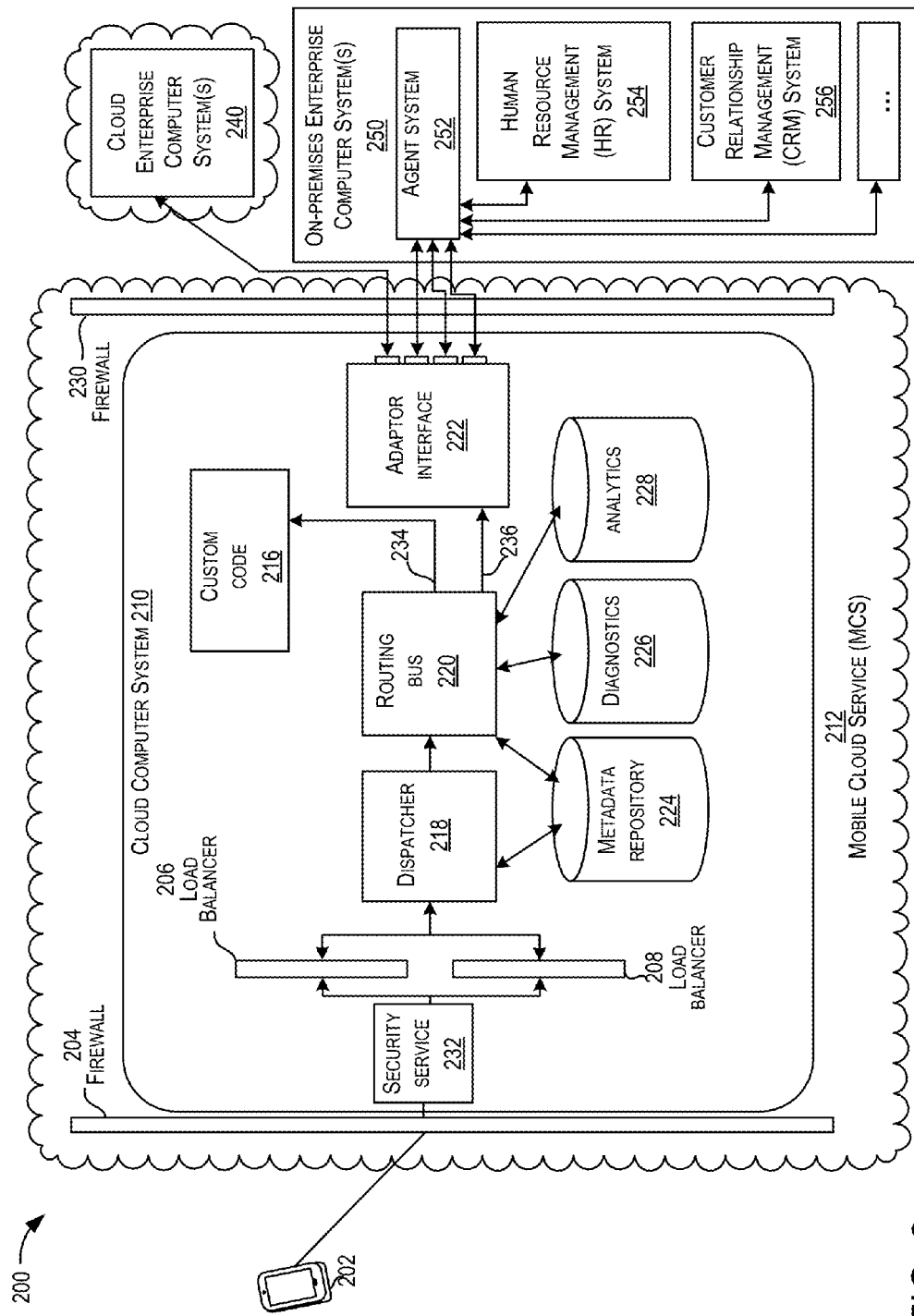
FIG. 2 is a block diagram of a computing environment to facilitate communication between a mobile computing device and enterprise computer systems according to some embodiments of the present invention.

FIG. 2 shows a block diagram of a computing environment 200 for facilitating communication between a mobile computing device and enterprise computer systems according to some embodiments of the present invention. For purposes of illustration, various examples are provided herein to describe techniques for enabling a mobile computing device (e.g., computing device 202) to communicate with one or more enterprise computer systems, such as a cloud enterprise computer system 240 (e.g., "serviceprovider.com") and an on-premises enterprise computer system 250. Such communications may be to exchange or transfer enterprise data, request services provided by an enterprise computer system, communicate messages, or combinations thereof.

Messages may include service invocation messages, result messages, request messages, other messages communicated internally, other messages communicated between a computing device and an enterprise computer system, or combinations thereof. A message may include a message type (e.g., a type value from a set of shared type constants), a correlation id (e.g., an id used to correlate this message with one or more other messages), priority information to support for priority based message queues, timeout, sensitivity indicator to support message data isolation, message source (e.g., a uniform resource identifier of a sender), a message destination (e.g., a uniform resource identifier that uniquely identifies the destination, a request context (e.g., request information from dispatcher), and/or a message payload. The payload may have different attributes depending upon the type of message that is being sent, such as parameter data and result data.

Enterprise data as described herein may include data received from an enterprise computer system, data sent to an enterprise computer system, data processed by an enterprise computer system, or combinations thereof. The enterprise data may be distinguishable from data for consumer applications and/or services. In some embodiments, for example, enterprise data may change based on application or use of the enterprise data, whereas data for consumer applications (e.g., consumer data) may remain static through use. In certain embodiments, enterprise data may include or be associated with rules that indicate criteria for storing, using, and/or managing the enterprise data. For example, enterprise data may be associated with policy information that indicates one or more policies for storing, using, and/or managing the enterprise data. In certain embodiments, policy information may be included in enterprise data. In certain embodiments, enterprise data may include data processed, stored, used, or communicated by an application or a service executing in an enterprise computer system. For example, enterprise data may include business data (e.g., business objects) such as JSON formatted data from enterprise applications, structured data (e.g., key value pairs), unstructured data (e.g., internal data processed or used by an application, data in JSON format, social posts, conversation streams, activity feeds, etc.), binary large objects ("BLOBs"), documents, system folders (e.g., application related folders in a sandbox environment), data using REST techniques (referred to herein as "RESTful data") (e.g., synchronization data made available by REST endpoints), system data, configuration data, synchronization data, or combinations thereof. In some embodiments, enterprise data may include REST-formatted enterprise data. REST-formatted enterprise data may include RESTful data. REST-formatted data may include data formatted according to REST techniques implemented by an enterprise computer system. Configuration or synchronization data may include data used for synchronization of enterprise data, such as versions, history, integration data, etc. Documents in enterprise data may include XML files, visual assets, configuration files, media assets, etc. A BLOB may include a collection of binary data stored as a single entity in a database management system, such as an image, multimedia object, or executable code, or as otherwise known in the art.

An enterprise computer system may include various computing systems that are configured to operate for an entity or an enterprise. For example, an enterprise computer system may include one or more computer systems, such as an enterprise server computer (e.g., a back-end server computer), to handle requests for services. An enterprise computer system may include applications and/or services, which can process and/or operate using enterprise data. For example, enterprise computer system 250 may provide one or more services and/or applications for managing or operating an enterprise. Services may include, without restriction, customer relationship management ("CRM"), human capital management ("HCM"), human resource ("HR") management, supply chain management, enterprise communication, email communication, business services, other enterprise management services or applications, or combinations thereof. Enterprise computer system 250 may include one or more computer systems dedicated to providing one or more services. In some embodiments, each different computer system providing a service may be located on-premise of an enterprise or may be located remotely from an enterprise. In some embodiments, multiple different computer systems supporting different services may be situated in a single geographical location, such as on-premises of an enterprise. In the example shown in FIG. 2, on-premises enterprise computer system 250 may include an HR system 254 and a CRM system 256, both of which may be located on-premises of an enterprise. In some embodiments, enterprise computer system 250 may include or implement an agent system 252 to facilitate or handle communication between cloud computer system 210 and one or more enterprise systems 254, 256. Enterprise computer systems, such as cloud enterprise computer system 240 and on-premises enterprise computer system 250 are described below in further detail.

The computer environment 200 may include MCS 212 implemented to operate as a secure intermediary computing environment that may facilitate communication between the computing device 202 and one or more enterprise computer systems because computing device 202 may not be configured to communicate with such enterprise computer systems. For example, some enterprise computer systems may be supported by legacy or back-end computer systems. Such systems may be configured to operate using different communication and/or security protocols. The protocols supported by such enterprise computer systems may be different from those supported by mobile computing devices. MCS 212 may support communication with different types of mobile computing devices. As such, MCS 212 may implement techniques to facilitate communication between enterprise computer systems and mobile computing devices to enable them to communicate with each other despite their incompatibilities in communication, such as differences between formats or communication protocols. For example, MCS 212 may translate communication protocols between mobile computing devices and enterprise computer systems.

Cloud computer system 210 may support MCS 212. Cloud computer system 210 may be implemented using hardware, software, firmware, or combinations thereof. For example, cloud computer system 210 may include one or more computing devices, such as a server computer. Cloud computer system 210 may include one or more memory storage devices and one or more processors. A memory storage device can be accessible to the processor(s) and can include instructions stored thereon which, when executed by the processor(s), cause the processor(s) to implement one or more operations disclosed herein. In some embodiments, the memory storage devices may operate as local storage (e.g., cache). Cloud computer system 210 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer readable storage medium. In some embodiments, local storage may include or implement one or more databases (e.g., a document database, a relational database, or other type of database), one or more file stores, one or more file systems, or combinations thereof. The local storage may store enterprise data.

In certain embodiments, cloud computer system 210 may include one or more data stores, such as a metadata repository 224, diagnostics store 226, and an analytics store 228. The data stores 224, 226, 228 may be accessible by any component in cloud computer system 210.

Metadata repository 224 may store all the metadata associated with MCS 212. This information may be composed of both run-time and design-time data, each having their own requirements on availability and performance. A tenant or subscriber of MCS 212 may have any number of applications. Each application may be versioned and may have an associated zero or more versioned resource APIs and zero or more versioned services implementations those resource API contracts. These entities are what the run-time uses to map virtual requests (mAPIs) to the concrete service implementation (service). This mapping provides a mobile developer with the luxury of not having to know the actual implementation service when she designs and builds her application. As well as not requiring her to have to republish a new application on every service bug fix. Metadata repository 224 may store one or more callable interfaces, which may be invoked by a computing device (e.g., computing device 202). The callable interfaces may be customizable by a user (e.g., a developer) of an application to facilitate communication with MCS 212. Metadata repository 224 may store metadata corresponding to one or more configurations of a callable interface. Metadata repository 224 may be configured to store metadata for implementing a callable interface. The callable interface may be implemented to translate between a one format, protocol, or architectural style for communication and another format, protocol, or architectural style for communication. Metadata repository 224 may be modifiable by an authenticated user via the external network.

Diagnostics store 226 may store diagnostics information about processing occurring in MCS 212. Diagnostics store 226 may store messages communicated via MCS 212 and log information. Analytics store 228 may store logging and analytics data captured during processing in the system.

On behalf of MCS 212, cloud computer system 210 may utilize its computing resources to enable execution of custom code 216 (e.g., operations, applications, methods, functions, routines, or the like). Computing resources may be allocated for use with respect to a particular user associated as a subscriber or tenant to MCS 212. Resources may be allocated with respect to a user, a device, an application, or other criterion related to a subscriber. MCS 212 may be scaled in or out, depending on the demand of mobile computing devices seeking to communicate with enterprise computer systems. MCS 212 can be configured such that it is elastic to handle surges and temporary periods of higher than normal traffic between mobile computing devices and enterprise computer systems. In some embodiments, MCS 212 may include elements that support scalability such that components may be added or replaced to satisfy demand in communication.

Computing device 202 may communicate (e.g., send a request message) with MCS 212 to request service provided by an enterprise computer system. Computing device 202 (e.g., a mobile computing device) may be implemented using hardware, firmware, software, or combinations thereof. Computing device 202 may communicate with enterprise computer systems 240, 250 via MCS 212. Computing device 202 may include or may be implemented as an endpoint device, a PDA, a tablet computer, a laptop computer, a mobile computing device, a desktop computer, a wearable computer, a pager, etc. Computing device 202 may include one or more memory storage devices and one or more processors. Computing device 202 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer readable storage medium. In some embodiments, local storage may include or implement one or more databases (e.g., a document database, a relational database, or other type of database), one or more file stores, one or more file systems, or combinations thereof. The local storage may store enterprise data.

In various embodiments, computing device 202 may be configured to execute and operate one or more applications such as a web browser, a client application, a proprietary client application, or the like. The applications can include specific applications configured for enterprise data and/or services provided by an enterprise computer system. Client applications may be accessible or operated via one or more network(s). Applications may include a graphical UI ("GUI") for operating the application.

Computing device 202 may communicate with MCS 212 via one or more communication networks using wireless communication. Examples of communication networks may include a mobile network, a wireless network, a cellular network, a LAN, a wide area network ("WAN"), other wireless communication networks, or combinations thereof. In certain embodiments, computing device 202 may establish a communication connection 214 with MCS 212 using a custom communication protocol (e.g., a custom protocol). Connection 214 may be established with MCS 212 through cloud computer system 210. The custom protocol may be an HTTP-based protocol. By utilizing a custom communication protocol, computing device 202 may operate on any computing device platform to communicate with cloud computer system 210.

Computing device 202 may communicate with cloud computer system 210 through one or more callable interfaces, e.g., APIs. A callable interface may be implemented on computing device 202. The callable interface may be implemented for custom applications that enable those applications to communicate with MCS 212. In some embodiments, a callable interface may be developed for MCS 212. The callable interface may enable applications to communicate with MCS 212 without having to adapt to differences in protocols (e.g., communication or development protocols) and/or architectural styles or formats.

MCS 212 may be protected by one or more firewalls 204, 230 to provide a secure environment to process requests and execute custom code 216. Communication between computing device 202 and MCS 212 may be separated by an external communication firewall 204. Firewall 204 may be connected with cloud computer system 210 to facilitate secure access to MCS 212. Firewall 204 may permit communication of messages between cloud computer system 210 and computing devices (e.g., computing device 202). Such messages (e.g., HTTP messages or REST messages) may conform to a communication protocol (e.g., HTTP or REST), which may be supported by a callable interface. In another example, a message between cloud computer system 210 and computing device 202 may conform to a communication protocol such as SPDY. MCS 212 may manage firewall 230 to secure communication between cloud computer system 210 and enterprise computer systems 240, 250. Firewall 230 may permit communication of messages between cloud computer system 210 and computing devices (e.g., computing device 202). Such messages (e.g., SPDY messages, HTTP messages or REST messages) may conform to a communication protocol (e.g., SPDY, HTTP, or REST). Communication between computing device 202 and enterprise computer systems 240, 250 may be two-way via MCS 212.

Because communication with computing device 202 and enterprise computer systems 240, 250 may occur via an unsecure, public network, firewalls 204, 230 provide an added layer of protection for communications to and from MCS 212. Firewalls 204, 230 may enable MCS 212 to distinguish its internal network from an external network connecting computing device 202 and enterprise computer systems 240, 250. In some embodiments, firewalls 204, 230, although shown as two distinct firewalls, may be implemented as a single firewall that encapsulates MCS 212.

Cloud computer system 210 may further operate as an intermediary computing environment by communicating with enterprise computer systems, some of which may have different communication protocols. Such communication protocols may be custom or specific to an application or service in communication with cloud computer system 210. Further, cloud computer system 210 may communicate with an enterprise computer system to provide enterprise services and/or to exchange enterprise data according to a format supported by the enterprise computer system. Cloud computer system 210 may maintain local storage (e.g., local cache) of enterprise data and may use the local storage to manage synchronization of the enterprise data between mobile computing devices and enterprise computer systems 240, 250.

Computing device 202 may communicate (e.g., send a request message) with MCS 212 to request service provided by an enterprise computer system. Requests that are received through firewall 204 may be processed first by security service 232. Security service 232 may manage security authentication for a user associated with a request. Thus, a cloud computer system may provide technical advantages that include providing security mechanisms described herein which may protect the integrity of customer communications and enterprise data. Technical advantages of cloud computer system may include preventing or reducing compromised communications and/or data from being compromised, authentication may occur initially, restricting access to only those who have the required credentials. Technical advantages of cloud computer system may include the services and service invocation flow being structured such that as requests come in they may only be able to access services for which they are authorized. By decoupling authorization from the rest of the system processing, another technical advantage may include the task of authorizing "what can be done by whom" being delegated to a dedicated provisioned security subsystem (e.g., an identity management system) that may be expanded to support whatever additional custom security measures are required by a specific corporate customer. In some embodiments, security authentication may be determined for a request, a session, a user, a device, other criterion related to the user, or combinations thereof. Security authentication may be performed for each request that is received. In some embodiments, security service 232 may determine authentication based on a previous verification of a request. Security authentication may be determined for a user or a device such that requests to different enterprise computer systems 240, 250 may be authenticated based on a single verification of security.

Further technical advantages of the invention may include a cloud computer system enabling a computing device to communicate with various enterprise computer systems, some of which may be implemented differently. For example, a computing device 202, cloud computer system 210, and enterprise computer system 250 may be located at different geographical locations, physically separated from each other. Therefore, computing device 202 can communicate with enterprise computer system 250 regardless of their location. Technical advantages may include a cloud computer system enabling a computing device to communicate requests for services to enterprise computer systems, which may support one or more distinct security protocols. In some cases, an enterprise computer system may be supported by a back-end system that is not easily adaptable to a different security protocol. In some cases, it may be desirable for developers of applications to be able to implement an application to be able to request services without knowledge of such security protocols. It may be equally desirable for a user (e.g., an administrator or an architect) of an enterprise computer system to be able to receive requests without accommodating for different types of applications, security protocols, and standards. Technical advantages may enable such desires to be met by implementation of a cloud computer system, as described herein, which can handle security authentication, such that requests can meet the security measures of different enterprise computer systems that are being requested.

In some embodiments, security service 232 may determine a security protocol for a requested enterprise computer system and accordingly generate a security token according to such security protocol. The security token may be passed along with a request to an enterprise computer system to enable that enterprise computer system to verify authentication based on the generated security token. Enterprise computer systems may support different security protocols. A security protocol may be a standard by which security is determined. Security may be verified based on a security token that is generated by security service 232. Security service 232 may determine a security protocol for an enterprise computer system identified for a request. In some embodiments, an enterprise computer system 250 may have an agent system 252, which may be configured or implemented according to a custom or specific security protocol supported by MCS 212. As such, MCS 212 may generate a security token according to such custom security protocol.

Cloud computer system 210 may include, implement, and/or communicate with one or more load balancer systems 206, 208. Upon determining security authentication, cloud computer system 210 may request any one of load balancer systems 206, 208 to examine a request that it receives and to detect which service the request is directed to. MCS 212 may be configured with load balancers 206, 208 and updated with resources that get started up, so that when a request comes in, load balancers 206, 208 can balance a requested load across the different resources.

Cloud computer system 210 may include a dispatcher 218 that may handle requests and dispatch them to the appropriate service. A request may be routed to an appropriate service upon dispatch. In some embodiments, a service itself may route an internal request to another internal service in MCS 212 or in an enterprise computer system. In some embodiments, dispatcher 218 may resolve a request to determine its destination based on a location (e.g., an address) of a destination identified in a URI and/or URL of the request. Dispatcher 218 may parse a request and its header to extract one or more of the following information: tenant identifier, service identifier, application name, application version, request resource, operation and parameters, etc. Dispatcher 218 can use the parsed information to perform a lookup in metadata repository 224. Dispatcher

218 may retrieve a corresponding application metadata. Dispatcher 218 may determine the target service based on the requested resource and the mappings in the metadata. While initially a very basic mapping, the metadata can be enhanced to provide for more sophisticated, rules-based dispatching. Dispatcher 218 may perform any dispatcher-specific logging, metrics gathering, etc. Dispatcher 218 may then perform initial authorization according to the application metadata. Dispatcher 218 may format the inbound request and any other necessary information and place the message on routing bus 220 for further processing. Dispatcher 218 may place a request on a queue and await the corresponding response. Dispatcher 218 may process responses received from routing bus 220 and return a response to computing device 202.

In addition to handling the dispatching for external requests, dispatcher 218 may also play a role in dispatching internal requests. Such internal requests can come in the form of composite services or custom code invocations to services. In both cases, the caller could use a logical service name as defined within the application. Dispatcher 218 may use the current execution context to determine the application and use that logical name to determine the appropriate service to invoke.

Cloud computer system 210 may include a routing bus 220 to manage deliver of messages to destinations registered with routing bus 220. Routing bus 220 may operate as a central system for managing communications in cloud service 212. Data communicated through routing bus 220 may be processed to capture and store the data. Routing bus 220 may provide a framework so that additional centralized services (additional authorization, debugging, etc.) can be plugged in easily as necessary. Data captured by routing bus 220 may be stored in diagnostics store 226 and/or analytics store 228.

Routing bus 220 may route messages to one or more destinations. In some embodiments, a message may include a request to execute custom code 216. In such embodiments, routing bus 220 may request 234 custom code 216 to be invoked. In some embodiments, routing bus 220 may pass on a request to a destination enterprise computer system identified by information in a request. Routing bus 220 may request 236 an adaptor interface 222 to perform translations, if necessary, to pass a request to an enterprise computer system, e.g., enterprise computer system 240 or enterprise computer system 250.

In certain embodiments, cloud computer system 210 may include or implement adaptor interface 222 to translate or convert a message to a protocol supported by a receiving enterprise computer system. Adaptor interface 222 may establish separate communication connections with each of enterprise computer systems 240, 250. Cloud computer system 210 may be configured to communicate with enterprise computer systems 240, 250 via one or more networks (not shown). Examples of communication networks may include the Internet, a mobile network, a public network, a wireless network, a cellular network, a LAN, a WAN, other communication networks, or combinations thereof. In certain embodiments, communication connections may be high-speed communication connections facilitated using high-speed communication trunks. Communication with an enterprise computer system 240, 250 may pass through firewall 230 which ensures that communication with an external network is secure to prevent unauthorized access to MCS 212 via such communications.

In some embodiments, cloud computer system 210 may facilitate notifications to a user of computing device 202. Cloud computer system 210 may include an alert management service that supports stateful interaction with a user, for example to deliver an alert based on user preferences through one or more channels, wait for a response, and take action based on the response. Responses to an alert sent on one channel may be received through another channel, which the service needs to be able to handle. The platform may come with built-in state models for popular interaction patterns and be extensible with new state models. Some alert channels may include known communication resources, either one-way or two-way. Examples include SMS, Twitter®, push notifications, and Google Cloud Messaging®.

In some embodiments, cloud computer system 210 may enable computing device to access and/or request one or more services, such as an object store service, database service, access web services, social services, resource services, or combinations thereof.

Cloud computer system 210 may provide an object store service that may provide a storage facility for BLOBs. The basic unit of storage can be text, with read and write operations. A basic query facility for JSON objects may also be offered.

Cloud computer system 210 may provide a database service to allow for connectivity to hosted databases for performing queries or writes. Required parameterization may require the full connection string for the database, the SQL string or stored procedure to execute, any parameters and possibly credentials. The necessary information can be provided at run time or be pre-configured in the application metadata.

Cloud computer system 210 may provide access to web services such as SOAP web services. Cloud computer system 210 may provide access to REST services, such as connectivity to arbitrary REST resources.

Cloud computer system 210 may provide access to social services that may provide basic integration with many of the popular social sites such as Facebook®, Twitter®, etc. These services may allow for third party authentication using the user's credentials from those sites as well as access to their services. Examples include sending a tweet or updating your status.

Cloud computer system 210 may provide a public cloud service to enable a user to simplify and optimize communication. For example, a service developer may use the generic web service of MCS 212 to talk to a resource hosted using cloud computer system's 210 cloud service.

A cloud computer system, such as one described herein, may enable mobile computing devices to communicate with enterprise computer system despite differences in computing resources. A cloud computer system may be equipped with more resources and a faster, more reliable connection to enterprise computer systems to communicate frequently to receive enterprise data. The cloud computer system may manage and coordinate requests for services from enterprise computer systems. By translating requests to a protocol supported by a recipient of a message, the cloud computer system reduces a burden on developers to configure applications for communication with different types of back-end computer systems. Enterprises are able to maintain their back-end systems without having to accommodate advances or changes in communication protocols supported for mobile devices. Different enterprise computer systems may support different security protocols based on a type of requests processed and services provided. By managing security authentication in a centralized manner for access to different enterprise computer systems, enterprise computer systems do not need to adapt to differences in security protocols. By authenticating a user of the cloud computer system, processing requests can become more efficient as authentication may not be performed in every instance.

In some embodiments, an application may be deployed under a mobile application framework ("MAF") that provides built in security to control access to the application and ensure encryption of sensitive data, such as Oracle MAF from Oracle Corp. MAF is a hybrid mobile architecture that uses HTML5 and Cascading Style Sheets ("CSS") (to render the UI in the web view), Java (for the application business logic), and Apache Cordova (to access device features such as GPS activities and e-mail). Because MAF uses these cross-platform technologies, the same application can be built for both Android and iOS devices without having to use any platform-specific tools. After an application is deployed to a device, it behaves as applications created using such platform-specific tools as Objective C or the Android SDK. Further, MAF allows for building the same application for smartphones or for tablets, thereby allowing reuse of business logic in the same application and targeting various types of devices, screen sizes, and capabilities.

Figure 3:
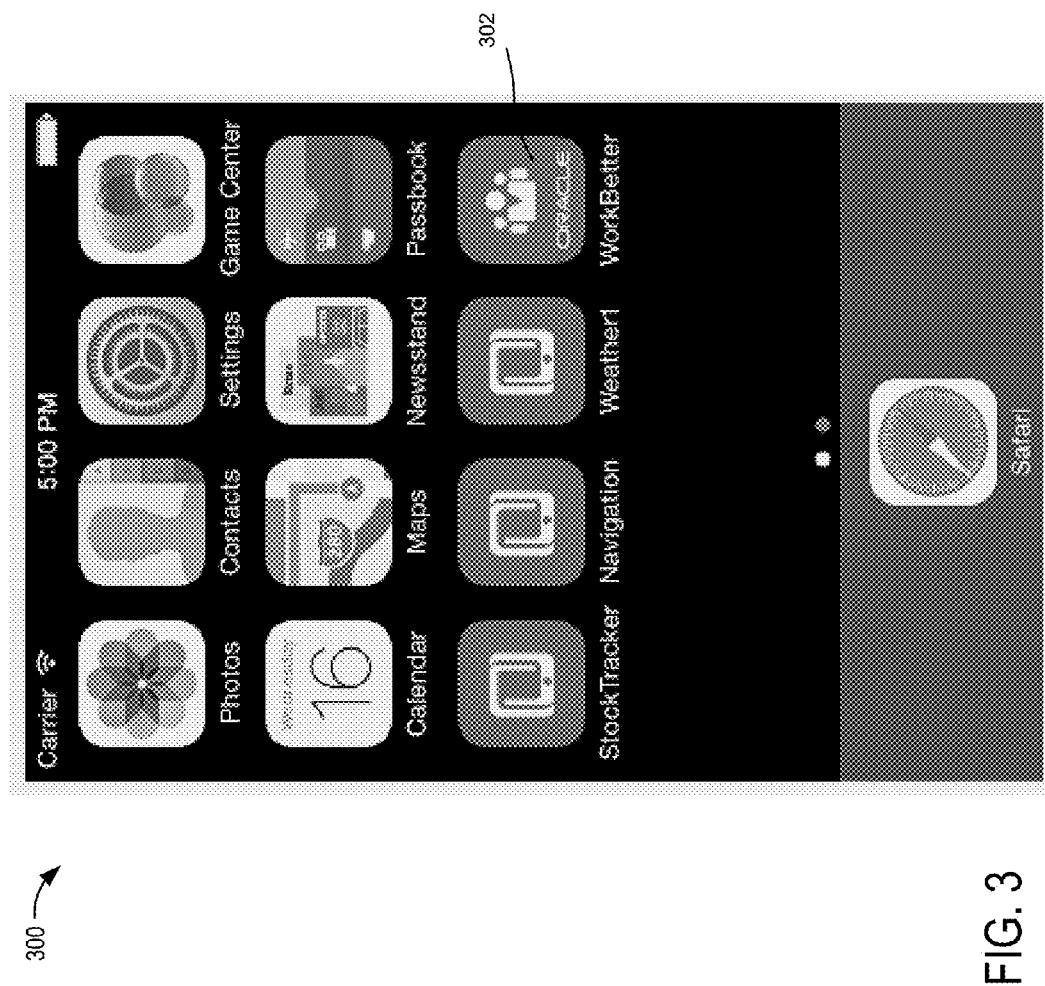
FIG. 3 illustrates a mobile application springboard in accordance with an embodiment of the present invention.

FIG. 3 illustrates an example mobile application springboard 300 that includes a MAF application 302 called "WorkBetter" that is deployed as a "heavy" application (e.g., a mobile application that sits in a mobile device in the same manner as a normal iPhone "app" obtained from the App store). A MAF application may include one or more embedded applications added as application features. Such added application features are represented as icons within the main application's springboard or navigation bar. Application features are essentially the building blocks of such mobile application. Each application feature that is integrated into a MAF application performs a specific set of tasks. Application features can be grouped together to complement each other's functionality. For example, an application feature that provides customer contacts may be paired with one for product inventory. Because each application feature has its own class loader and web view, application features are independent of one another, thus a single MAF application can be assembled from application features created by several different development teams. Application features can also be reused in other MAF applications. A MAF application itself can be reused as the base for another application, allowing independent software vendors ("ISVs") to create applications that can be configured by specific customers.

In addition to hybrid mobile applications that run locally on the device, application features may be implemented as any of the following mobile application types, depending on the requirements of a mobile application and available resources:

For mobile web applications hosted on a server, although the code can be portable between platforms, access to device features and local storage can be limited as these applications are governed by the device's browser.

Native applications are authored in either Xcode or through the Android SDK and are therefore limited in terms of serving both platforms. Reuse of code is likewise limited.

MAF supports authentication and access control for refined security at the feature level in an application where a developer can specify an appropriate login server, e.g., a server running "Oracle Identity Management" and/or "Oracle WebLogic" with basic authentication, a server supporting OAuth protocols, etc. At runtime users are presented with login screens and appropriate tokens are accessible for further Web service calls. With MAF, developers can build single UIs that meet the needs of users with different privileges (e.g., show/hide components based on user role or privilege).

MAF enforces communication encryption using SSL/TLS (HTTP secure ("HTTPS")), on-device encryption to keep credentials in an encrypted key store to be used for validation when supporting offline authentication, and SQLite database encryption by using the SQLite encryption extension. Encrypting an SQLite database for an application built with MAF may be performed via a configuration option when the application is developed. In some embodiments, MAF supports offline and online modes of operation for an application so a self-contained application can run on a mobile device in connected and disconnected modes. For data access/storage, such application may leverage a local encrypted SQLite database. The application may be built such that initial access to data is performed from remote servers through Web services, and the data is then stored in the local SQLite database for offline access. The data can be replicated and synchronized to the server when connectivity is available again. MAF also supports local storage of user authentication credentials to enable offline authentication/authorization to secured applications.

Figure 3A:
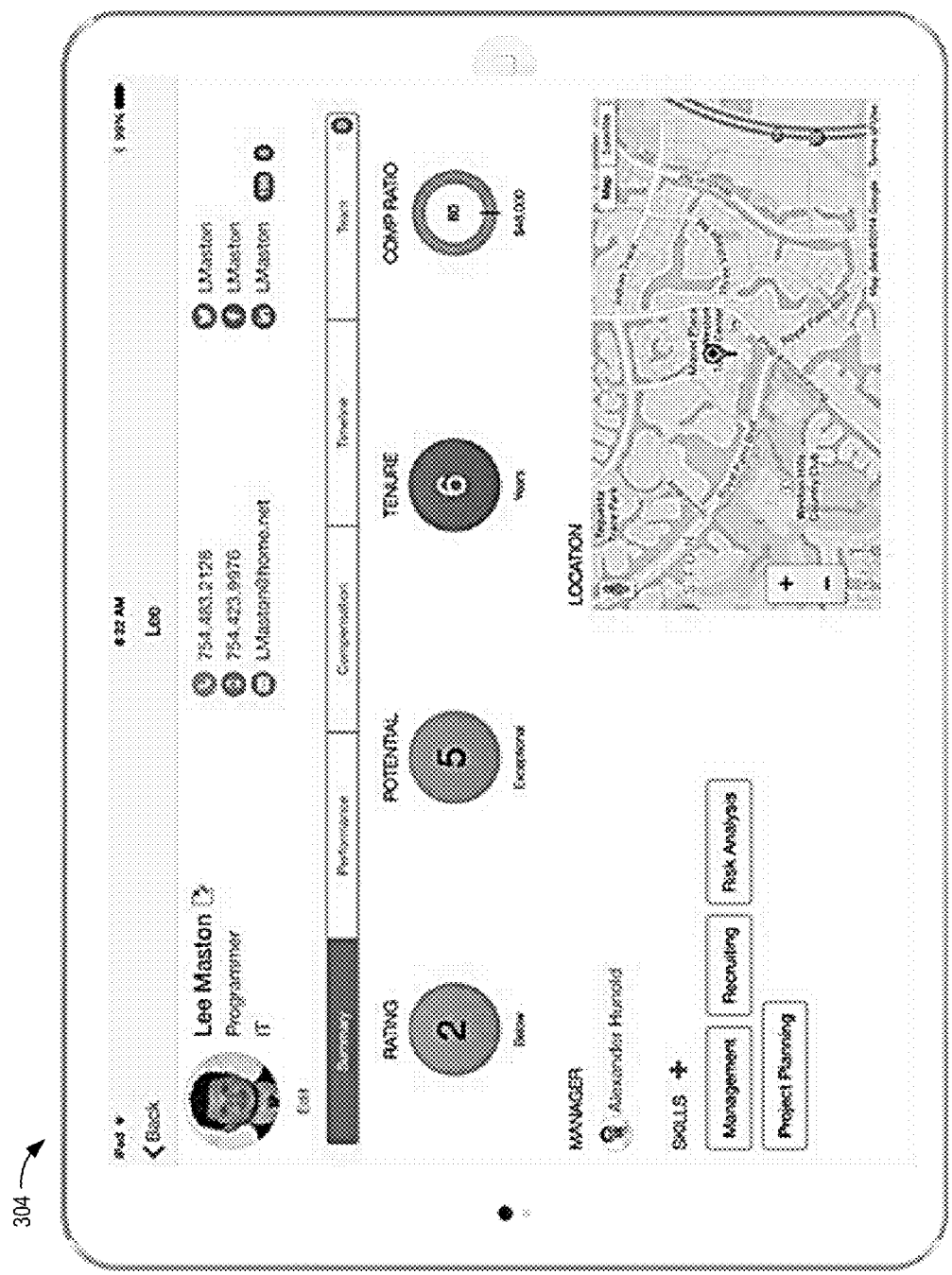
FIGS. 3A and 3B illustrate a mobile application user interface ("UI") in accordance with an embodiment of the present invention.
Figure 3B:
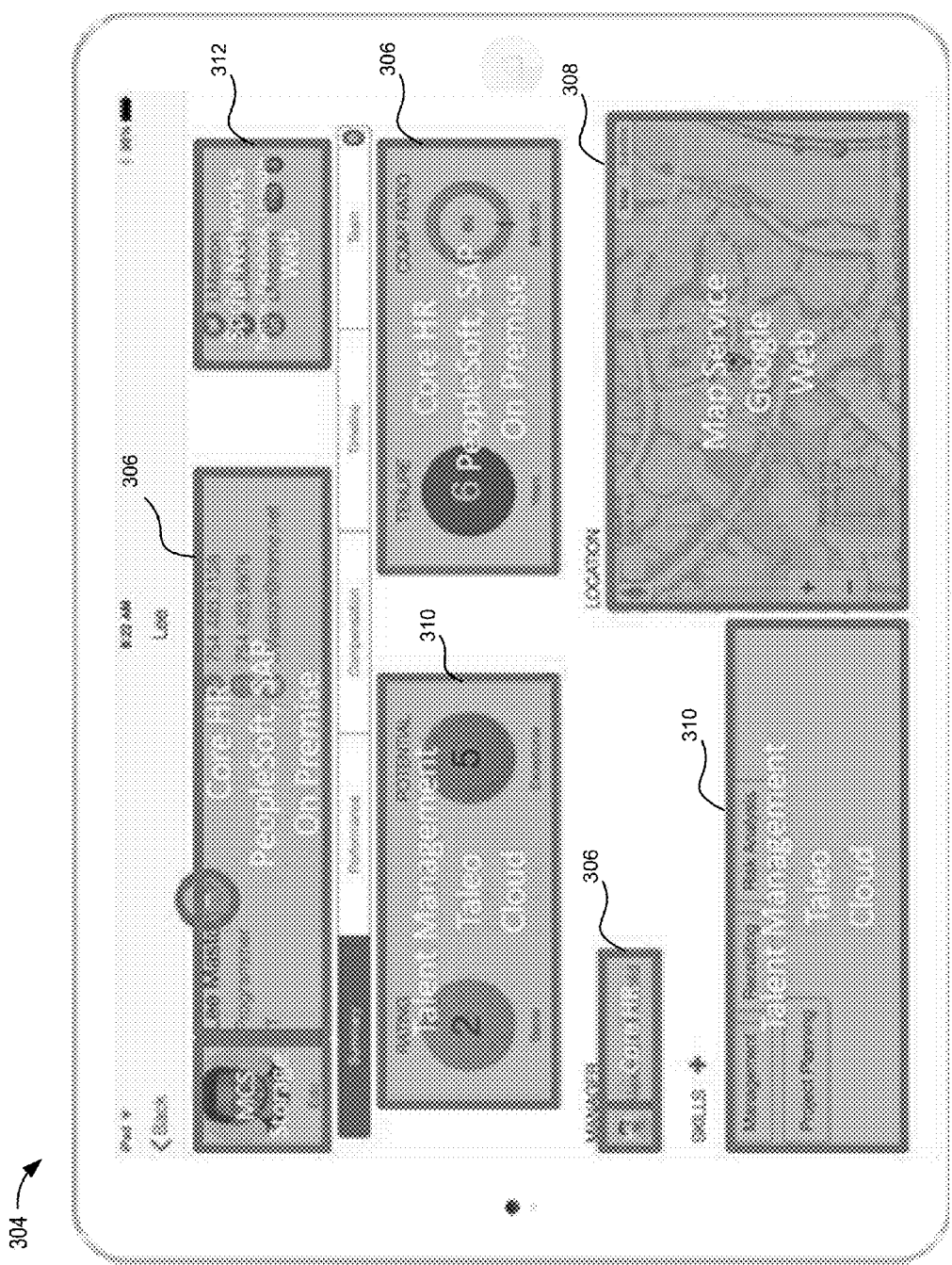

FIGS. 3A and 3B illustrate an HR mobile application UI 304 in accordance with an embodiment of the present invention. UI 304 may be provided upon opening an icon on a springboard such as mobile application springboard 300 of FIG. 3. In FIG. 3A, UI 304 includes various HR related information about an employee, such as picture, title, contact information, social networking information, performance/rating information, compensation information, manager, skills, location, etc. FIG. 3B indicates various sources where the information in UI 304 may be obtained from, such as services located on premise or in the cloud. For example, basic employee information may be obtained from on premise core HR services 306 such as PeopleSoft, Systems, Applications & Products ("SAP"), etc., while location information is obtained from a map service 308 such as Google. Similarly, performance information may be obtained from a talent management cloud service 310 such as TALEO, and social networking information 312 (e.g., Twitter, Facebook, LinkedIn, etc.) may be obtained from the web. In one embodiment, the information from these various sources is channeled through MCS 212 (see FIG. 2) before being sent down to the application on the mobile device 202 (see FIG. 2).

Figure 4:
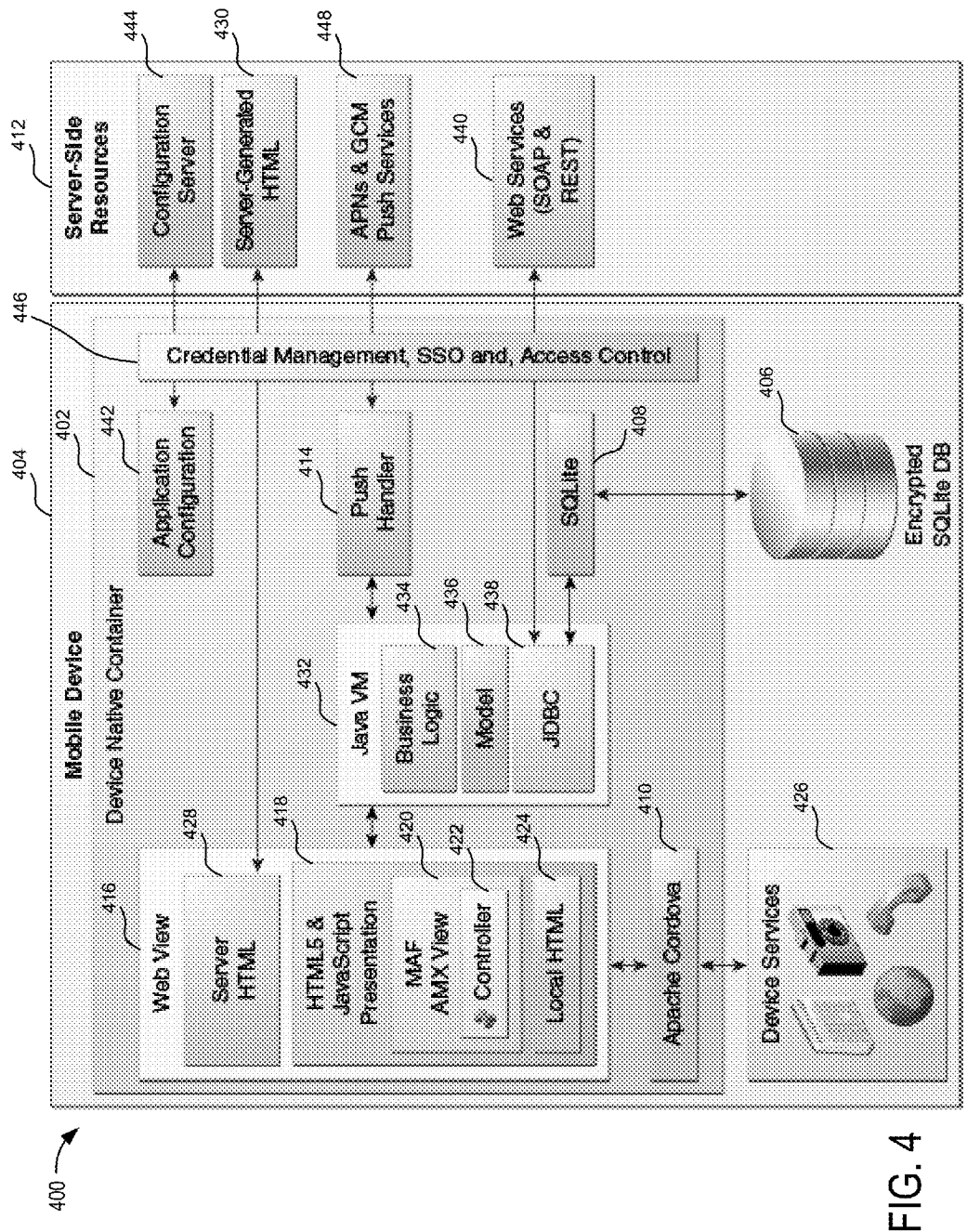
FIG. 4 is a block diagram of a mobile application framework runtime architecture in accordance with embodiments of the present invention.

FIG. 4 is a block diagram of a MAF runtime architecture 400 according to an embodiment. Runtime architecture 400 includes a "thin" device native container 402 deployed to a mobile device 404. Runtime architecture 400 represents the MVC development approach which separates the presentation from the model layer and the controller logic. Device native container 402 allows a MAF application to function as a native application on different platforms (e.g., iOS, Android, etc.) by interacting with a local SQLite database 406 (via SQLite 408), mobile device services 426 (via Cordova APIs of Apache Cordova 410), and server-side resources 412 such as a Configuration Server 444, Server-Generated HTML 430, Push Services 448, and Web Services 440.

Device Services 426 are services and features that are native to device 404 such as camera, GPS, e-mail, etc. Configuration Server 444 is a server based on Web Distributed Authoring and Versioning ("WebDav") and hosting configuration files used by the application configuration services. WebDav is defined in, e.g., Internet Engineering Task Force ("IETF") Request for Comments ("RFC") 4918.

Configuration Server 444 is delivered as a reference implementation. Any common WebDav services hosted on a Java 2 Platform, Enterprise Edition ("J2EE") server can be used for this purpose. Server-Generated HTML 430 includes Web content hosted on remote servers and used for browser-based application features. Push Services 448 may include, for example, Apple Push Notification Services ("APNs") and Google Cloud Messaging ("GCM") push services that are notification providers that send notification events to MAF applications. Web Services 440 are, for example, remotely hosted SOAP-based web services.

Device native container 402 includes Web View 416 that uses a mobile device's web engine to display and process web-based content. In a MAF application, Web View 416 delivers the UI by rendering the application markup as HTML 5. The UI may be created for a mobile application feature by implementing any of the following content types: MAF Application Mobile XML ("AMX") Views 420, Controller 422, local HTML 424, or server HTML 428, where MAF AMX Views 420, Controller 422, and local HTML 424 provide HTML5 and JavaScript presentation 418. Application features implemented from various content types can coexist within the same mobile application and can also interact with one another.

Applications whose contents are implemented as MAF AMX views 420 reside on device 404 and provide the most authentic device-native user experience, similar to an application authored in the language specific to the device's platform. MAF provides a set of code editors that enable a user to declaratively create a UI from components that are tailored to the form factors of mobile devices. These components can be used to create the page layout (e.g., list view) as well as input components (e.g., input fields). When a user develops MAF AMX views 420, they can leverage data controls which enable the user to declaratively create data-bound UI components and access a Web service and the services of a mobile device (e.g., camera, GPS, or e-mail). At runtime, a JavaScript engine in Web View 416 renders MAF AMX view definitions into HTML5 and JavaScript.

For applications whose contents are implemented as Controller 422, Controller 422 governs the flow between pages in the mobile application. Controller 422 enables a user to break an application's flow into smaller reusable task flows and include non-visual components such as method calls and decision points. In the embodiment of FIG. 4, Controller 422 is included in MAF AMX Views 420 and is called by MAF AMX Views 420 to, e.g., transition a page and/or activate actions. However, in alternative embodiments, Controller 422 may be implemented as a peer of MAF AMX Views 420.

For applications whose contents are implemented as local HTML 424, HTML pages run on the device as part of the MAF application. Local HTML files can access device-native features and services through Apache Cordova 410 and JavaScript APIs.

For applications whose contents are implemented as server HTML 428, the UI is delivered from server-generated Web pages (Server-Generated HTML 430) that can open within the application feature's Web View 416. Within the context of MAF, this content type is referred to as remote URL. The resources for these browser-based applications do not reside on the device 404. Instead, the UI, page flow logic, and business logic are delivered from a remote server.

When one of these remotely hosted Web applications is allowed to open within Web View 416, it can use Cordova JavaScript APIs to access any designated device-native feature or service such as the camera or GPS capabilities.

When implementing an application using the remote URL content, a user can leverage an existing browser-based application that has been optimized for mobile use, or use one that has been written specifically for a specific type of mobile device. For applications that can run within the browsers on either desktops or tablets, the user can implement the remote URL content using applications created through rich client-based components such as those provided by "Oracle ADF Faces" from Oracle Corp. For applications specifically targeted to mobile phones, the remote URL content can be delivered from Web pages created using MAF. Not only can applications authored with MAF render on a variety of smartphones, but they can gracefully degrade to the reduced capabilities available on feature phones through UIs constructed with Apache Trinidad JSF components and dynamically selected style sheets. Because the content is served remotely, the application is available only as long as the server connection remains active.

Device native container 402 further includes Apache Cordova 410 that provides JavaScript APIs that integrate the device's native features and services into a mobile application. Although a user can access these APIs programmatically from Java code (or using JavaScript when implementing a MAF mobile application as local HTML 424), the user can add device integration declaratively when creating MAF AMX pages because MAF packages these APIs as data controls.

Device native container 402 further includes a Java Virtual Machine ("JVM") 432. Java provides a Java runtime environment for a MAF application. JVM 432 is implemented in device-native code, and is embedded (or compiled) into each instance of the MAF application as part of the native application binary. JVM 432 is based on the Java Platform, Micro Edition ("Java ME") Connected Device Configuration ("CDC") specification. In runtime architecture 400, JVM 432 includes business logic 434, model 436, and Java database connectivity ("JDBC") 438. Java enables business logic 434 in MAF applications. Managed Beans ("MBeans") are Java classes that can be created to extend the capabilities of MAF, such as providing additional business logic for processing data returned from the server. MBeans are executed by the embedded Java support, and conform to the Java ME CDC specifications. Model 436 includes the binding layer that connects the business logic components with the UI. In addition, the binding layer provides the execution logic to invoke web services 440 such as remotely hosted SOAP-based web services. These services are accessed through the Java layer (JVM 432). Application features authored in MAF AMX access SOAP-based data services through data controls. JDBC 438 is an API that enables the model layer to access the data in encrypted SQLite database 406 through Create, Read, Update, and Delete ("CRUD") operations.

Device native container 402 further includes Application Configuration 442 which refers to services that allow application configurations to be downloaded and refreshed, such as URL endpoints for a web service or a remote URL connection of a configuration server 444. Application configuration services download the configuration information from a server-side WebDav-based service.

Device native container 402 further includes module 446 that provides Credential Management, Single Sign-on ("SSO"), and Access Control. MAF handles user authentication and credential management through the "Oracle Access Management Mobile and Social" ("OAMMS") identity manager ("IDM") SDKs. MAF applications perform offline authentication, meaning that when users log in to the application while connected, MAF maintains the username and password locally on device 404, allowing users to continue access to the application even if the connection to the authentication server becomes unavailable. MAF encrypts the locally stored user information as well as the data stored in local SQLite database 406. After authenticating against the login server, a user can access all of the application features secured by that connection. MAF also supports the concept of access control by restricting access to application features (or specific functions of application features) by applying user roles and privileges. For remotely served Web content, MAF uses whitelists to ensure that only the intended URIs can open within the application feature's web view 416 (and access the device features).

Device native container 402 also enables push notifications via a Push Handler 414 that communicates with push services 448 included in server side resources 412 and enables MAF applications to receive events from notification servers such as the iOS or Android notification servers. The Java layer (JVM 432) handles the notification processing.

In runtime architecture 400, device native container 402 interacts with encrypted SQLite Database 406 that is an embedded SQLite database that protects locally stored data and is called by the model layer using JDBC 438. The MAF application generates this lightweight, cross-platform relational database 406. Because database 406 is encrypted, it secures data if the device is lost or stolen. Only users who enter the correct user name and password can access the data in this database.

Figure 5:
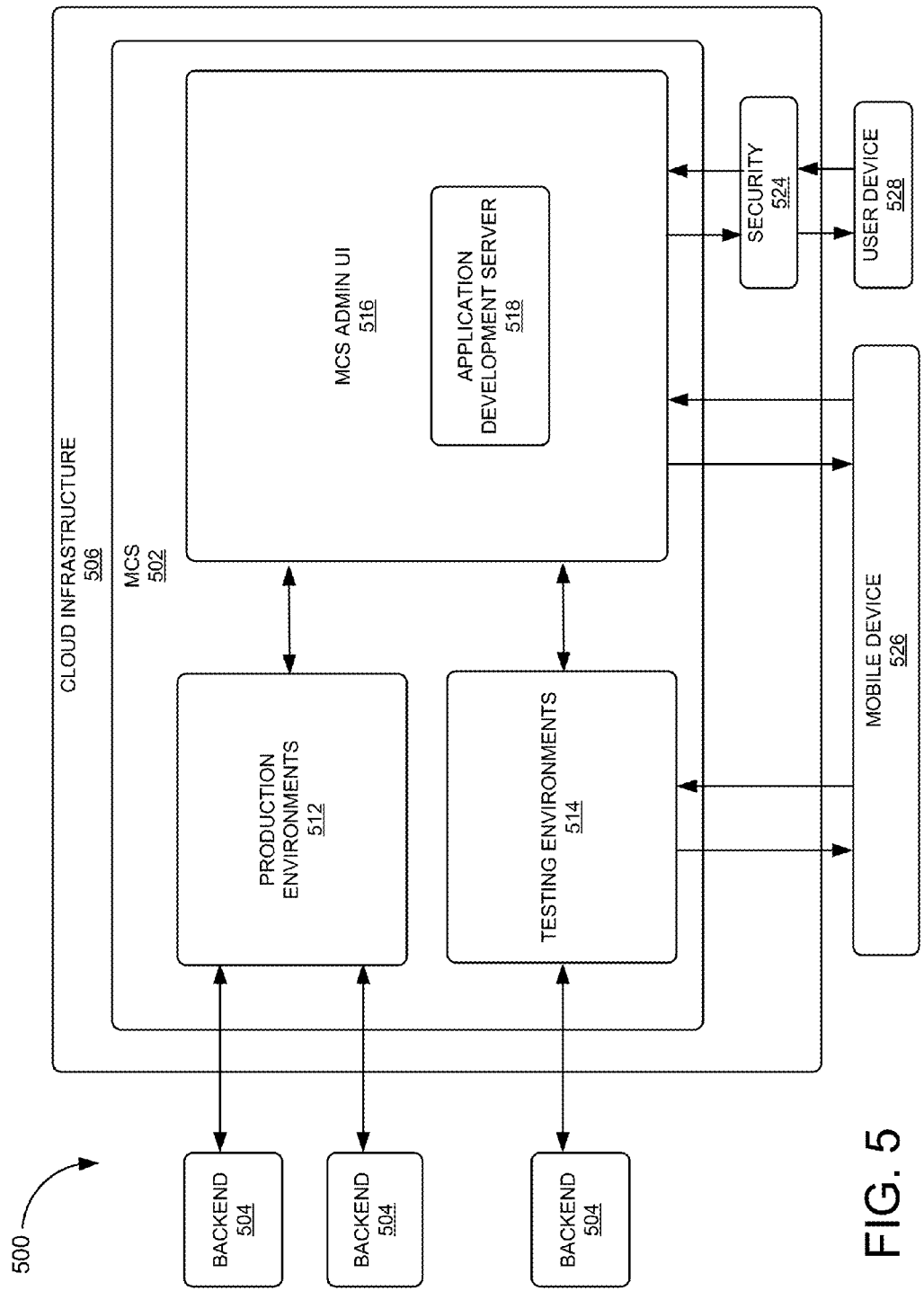
FIG. 5 is a block diagram of a system for developing mobile applications in a mobile cloud infrastructure in accordance with embodiments of the present invention.

FIG. 5 is a block diagram of a system 500 for developing mobile applications in a mobile cloud infrastructure in accordance with embodiments of the present invention. In system 500, a user may use a user device 528 to develop and build applications in a cloud infrastructure 506 via a Web based tool. In one embodiment, the applications may be downloaded on a mobile device 526 over the air, thus obviating the need for an App store. The native applications talk to backends 504 created in MCS 502. In one embodiment, MAF runtime architecture 400 of FIG. 4 may be used to deliver an application to mobile device 526. In one embodiment, a declarative syntax of an application is deployed on mobile device 526 over the air, and the declarative syntax is interpreted on mobile device 526 by MAF runtime architecture 400 of FIG. 4.

Cloud infrastructure 506 includes MCS 502 that provides an admin UI 516 through which application development may be performed. MCS 502 further includes production environments 512 and testing environments 514 in which a mobile application may be developed and tested, respectively. These environments provide production/testing functionality by talking to corresponding backends 504 via connectors. An application is first developed in testing environments 514. Once published, the application moves to production environments 512.

In one embodiment, a mobile application is developed by using user device 528 to communicate with MCS admin UI 516 (also referred to as portal) through a security layer 524. MCS admin UI 516 includes an application development server 518 that can be interfaced via MCS admin UI 516. An application that is developed in MCS admin UI 516 can be run on a browser of user device 528 or on mobile device 526 by communicating with production environments 512 and/or testing environments 514. In one embodiment, when an application is deployed on mobile device 526, mobile device 526 communicates with testing environments 514. However, if the application is updated on mobile device 526, such updates are performed through MCS admin UI 516.

An application that is developed in system 500 may be built as a light application or a heavy application. A heavy application is a full application such as apps that are downloaded from an App store. A light application is an application that is deployed as an added feature to an already deployed full application (i.e., a hosting application) such as an Oracle app. The hosting application acts as a container that holds the light applications. Both heavy and light applications can be further containerized by a security container, as described herein with reference to FIG. 7.

Figure 6:
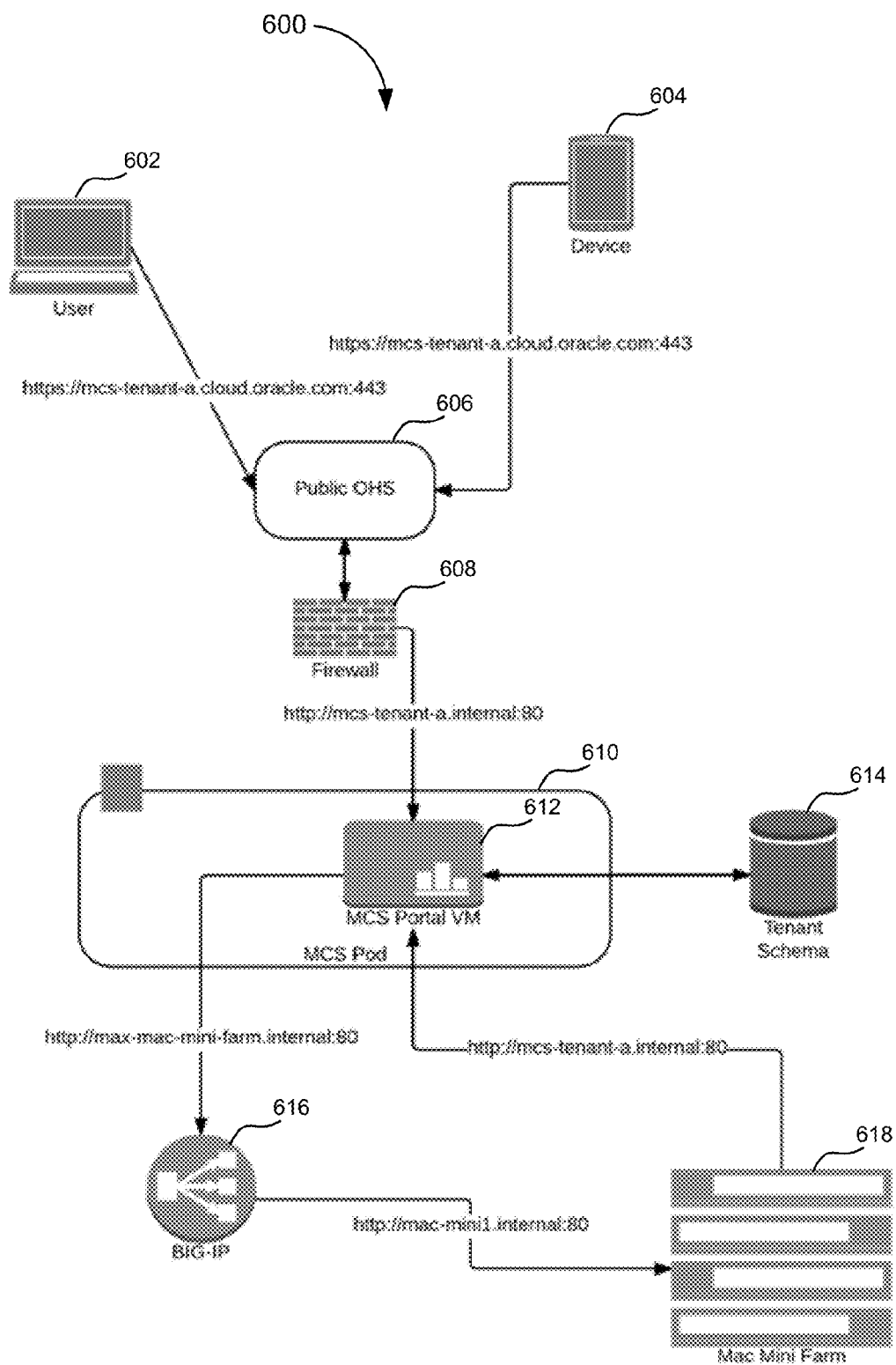
FIG. 6 is a block diagram of network components in a system for building mobile applications in accordance with embodiments of the present invention.

FIG. 6 is a block diagram of network components in a system 600 for building mobile applications in accordance with embodiments of the present invention. In system 600, a first device 602 interacts with an MCS website (denoted as "https://mcs-tenant-a.cloud.oracle.com" in the example embodiment of FIG. 6) to initiate build requests, and a second device 604 communicates with the MCS website to perform an over the air install of native applications. Generally, the over the air install includes downloading a file such as a property list file (a "p-list" file with extension ".plist") that describes the application and the location from which to download the corresponding application archive file (a file with ".ipa" extension and storing the application), and then downloading the application archive file from that location.

First device 602 and second device 604 interact with the MCS website by communicating with an MCS Portal VM 612 of a server 610 through a public Oracle HTTP Server ("OHS") 606. Public OHS 606 is a public facing HTTP server that directs traffic to MCS Portal VM 612 located behind a firewall 608. Public OHS 606 implements a WebGate that is a web server plugin for Oracle Access Manager ("OAM") to intercept HTTP requests and forward them to the corresponding Access Server for authentication and authorization. Accordingly, public OHS 606 authenticates the user of first device 602, passes along user credentials to MCS Portal VM 612, and terminates the SSL connection with first device 602. In the example embodiment of FIG. 6, first device 602 and second device 604 access public OHS 606 at "https://mcs-tenant-a.cloud.oracle.com" with port 443 used for https.

MCS Portal VM 612 is a standard WebLogic Server ("WLS") application whose data is backed by a single tenant schema in schema service 614 and its corresponding application development client is written using the Oracle Jumpstart Enterprise Toolkit ("JET") framework. WebLogic Server is a Java EE application server developed by Oracle Corp. A database schema is a container of objects (e.g., tables, views, stored procedures, etc.) to logically group them.

Figure 7:
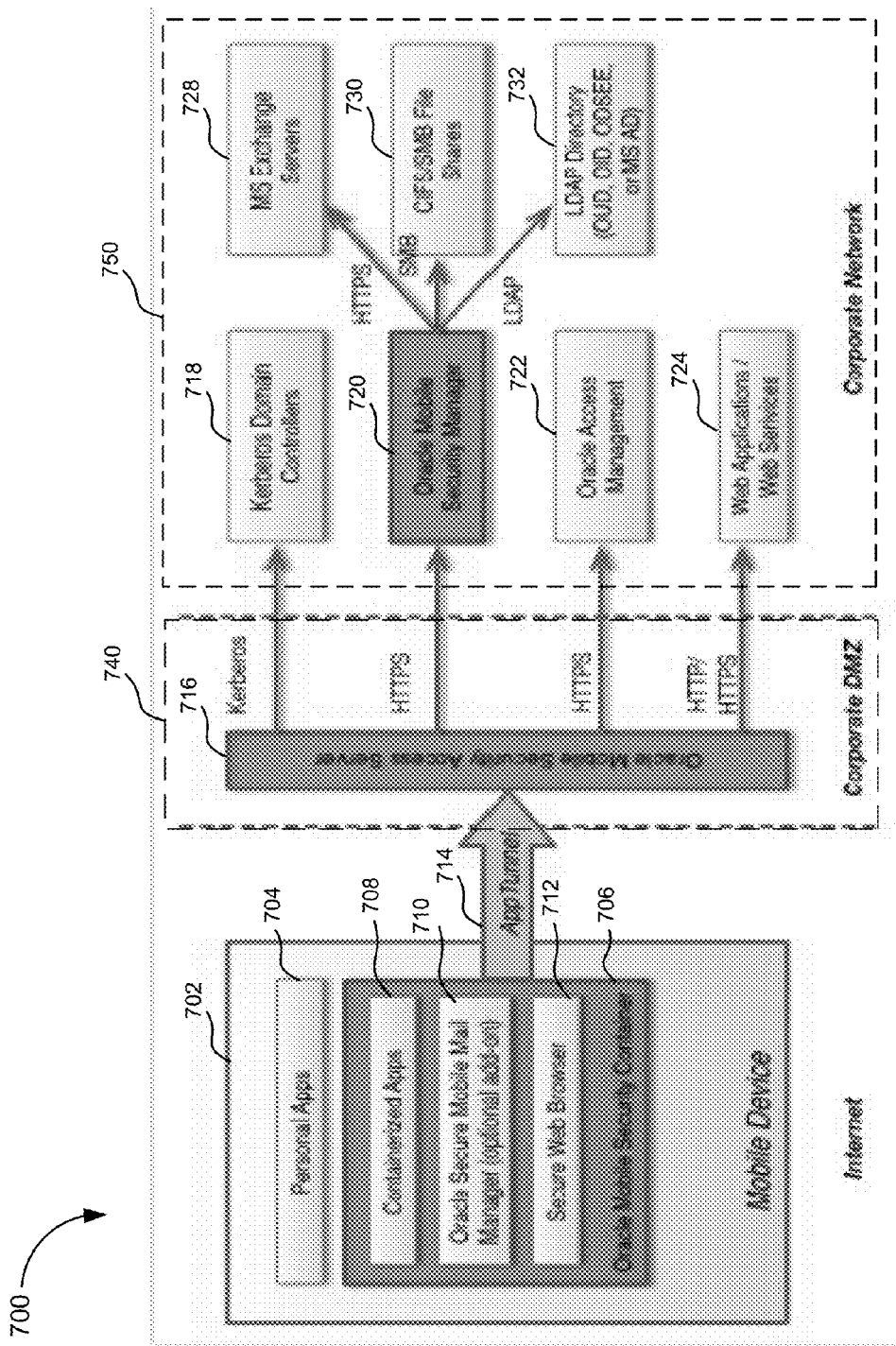
FIG. 7 is a block diagram of mobile security suite components in accordance with embodiments of the present invention.

MCS Portal VM 612 is a single tenant and its security is provided via Oracle Web Services Manager ("OWSM," described herein with reference to FIG. 7). Accordingly, MCS Portal VM 612 runs WLS in a trusted zone. MCS Portal VM 612 handles requests by first device 602 and has a connection to a schema service 614. MCS Portal VM 612 is also connected to a build server farm 618 via a load balancer 616. In the embodiment of FIG. 6, MCS Portal VM 612 uses open port 80 (or equivalent) for http communication to/from Public OHS 606, to load balancer 616, and from individual servers in server farm 618.

Schema service 614 interacts with the MCS Portal VM 612 and stores application data, enterprise signing certificates, and provisioning profiles for the tenant. Load balancer 616 routes farm tasks to servers in server farm 618. The routing may initially be performed in a round-robin fashion. In the embodiment of FIG. 6, load balancer 616 is a BIG-IP appliance from F5 Corp. which uses open port 80 (or equivalent) and provides redundancy. Server farm 618 includes a number of servers (e.g., 20 servers) that handle build jobs. It is connected to a filer (not shown) for storing application binaries (e.g., 5TB). In one embodiment, connections of server farm 618 are handled via a local Tomcat instance running locally on a server, and build tools and processes are handled by native OSX calls.

Building an Application

In one embodiment, once a user of first device 602 has created an application and wishes to produce a native binary, the user initiates a build POST request at the MCS website (e.g., at "https://mcs-tenant-a.cloud.oracle.com/max/build") via a UI of first device 602. POST is a request method supported by the HTTP protocol for requesting a web server to accept and store the data enclosed in the body of the request message. The payload of the build POST request includes the application identifier ("ID") for the application. Public OHS 606 receives the request, terminates the SSL, authenticates and authorizes the user against OAM (assuming the user is logged in), places the user identity into HTTP headers of the request, and forwards the request past firewall 608 to the WLS server of MCS Portal VM 612 (e.g., the WLS server running at "http://mcs-tenant-a.internal/max/build").

MCS Portal VM 612 receives the request, authorizes the user for privileges against the requested application, and sends a query to the tenant schema service 614 for application data, tenant enterprise certificate, encrypted certificate password, and tenant provisioning profile. Once schema service 614 returns the requested items, MCS Portal VM 612 creates a new entry in a table of build jobs (stored at schema service 614) to record the build attempt and capture the primary key of the corresponding new build record. MCS Portal VM 612 also creates a new POST request against build server farm 618 behind load balancer 616 (e.g., at "http://max-mini-farm.internal/build/initiate"), passing in the corresponding parameters (application data, signing certificate and password, and provisioning profile) into the body of the request as well as a callback URL for job completion, where the callback URL encodes the primary key of the corresponding build record in the table of build jobs. The following functionality provides an example of a build POST request payload that includes the corresponding parameters:

applicationData: (app data)
signingCertificate: (cert)*
signingPassword: (password)*
provisioningProfile: (profile)
callbackUrl: http://mcs-tenant-a.internal:3000/maxbuild/complete?jobId=(BuildJobId)**

In this example, the certificate and the password are created by the user of first device 602 exclusively for building mobile application according to this embodiment (i.e., the certificate and the password are not shared with services other than building mobile application according to this embodiment), and port 3000 is not publicly accessible.

Load balancer 616 maintains a list of healthy servers in server farm 618. In one embodiment, this is done via a health check that performs sanity checks at certain time intervals (e.g., every few minutes). Upon receiving a build job request, load balancer 616 selects a server from the healthy server pool in the list and routes the build job request to that server (e.g., routes the job to "http://mac-mini1.internal/build/initiate"). In one embodiment, selecting the server is according to a round robin process for build jobs that are of equal complexity.

In one embodiment, a Tomcat web server is running on the selected server in server farm 618. The Tomcat web server receives the build job request and starts an external process that runs on an asynchronous servlet to prevent the input/output from blocking the request thread pool. When the process completes, the Tomcat web server creates a POST request to the callback URL in the request payload. The following functionality provides an example payload for this new request:

result: (success if successful, etc)
binaryKey: (jobId)

MCS Portal VM 612 receives the new request and updates the corresponding record in the table of build jobs with the binary key from the payload if the event has been successful. It also informs the client (i.e., first device 602) that the build job was completed (e.g., via polling on Oracle Business Intelligence Enterprise Edition ("OBIEE") 11g push or asynchronous servlet with OBIEE 12c planned) and produces a QR code with an encoded link for downloading the application (e.g., "https://mcs-tenant-a.cloud.oracle.com/max/native-application/(binaryKey)").

Installing an Application

In one embodiment, once a user of second device 604 scans the QR code on second device 604, an "over the air" install is initiated. Scanning the QR code opens the URL encoded in the QR code (e.g., "https://mcs-tenant-a.cloud.oracle.com/max/native-application/(binaryKey)"). Public OHS 606 receives the request, terminates the SSL, authenticates and authorizes the user against OAM (assuming the user is logged in), places the user identity into the HTTP headers of the request, and forwards the request past firewall 608 to the WLS server of MCS Portal VM 612 (e.g., running at "http://mcs-tenant-a.internal/max/build").

MCS Portal VM 612 receives the request, authorizes the user for privileges against the requested application, determines user-agent (in this context, the OS framework of the device, e.g., iOS vs Android) of the requesting device (second device 604), identifies the platform of second device 604 (e.g., iOS), and forwards the request to a corresponding URL (e.g., "https://mcs-tenant-a.cloud.oracle.com/max/native-application/plist/(binaryKey)") by directing to Public OHS 606, which will in turn forward the request to MCS Portal VM 612 to authorize (as performed during the build process described herein to ensure that the user is allowed to download the application). MCS Portal VM 612 receives the forwarded request and generates a property list file (e.g., an iOS "p-list" file) that includes application information for a corresponding platform (e.g., iPhone) as well as a link to the binary (e.g., "https://mcs-tenant-a.cloud.oracle.com/max/native-application/ios/(binaryKey)").

Second device 604 then prompts the user if they want to install the application. Assuming yes, second device 604 follows the link to the binary (e.g., "https://mcs-tenant-a.cloud.oracle.com/max/native-application/ios/(binaryKey)") by directing to Public OHS 606 which will in turn forward the request to MCS Portal VM 612 to authorize (as performed during the build process described herein to ensure that the user is allowed to download the application). MCS Portal VM 612 receives the request and generates a new build job request to build server farm 618 (e.g., at "http://max-mini-farm.internal/download/ios/(binaryKey)") behind load balancer 616. Load balancer 616 selects a server in build server farm 618 (e.g., via a round robin process) from a healthy server pool and routes the build job request to that server (e.g., to "http://mac-mini1.internal/download/ios/(binaryKey)"). An application server (e.g., a Tomcat) on the selected server receives the request, determines if corresponding content exists, and streams the binary from the network (e.g., from "Filer/filer_mnt/generated_binaries/(binaryKey)/result.ipa"). Load balancer 616 returns the streamed response back to MCS Portal VM 612, which receives the response and copies it into its request's output stream to second device 604. Finally, second device 604 receives the binary and performs the install.

FIG. 7 is a block diagram of mobile security suite components in an embodiment that uses security services provided by a mobile security suite 700 such as OMSS. OMSS components are distributed across the corporate DMZ 740 and the enterprise intranet (or corporate network 750). Under OMSS, a security container 706 such as "Oracle Mobile Security Container" from Oracle Corp. is installed on a mobile device 702 and is configured to hold "containerized" applications 708, e.g., applications that have been securely linked to their specific container. Mobile device 702 may also include other personal applications 704 held outside security container 706.

Security container 706 includes a secure web browser 712, a file manager (not shown), a document editor (not shown), and an optional secure mobile mail manager 710. Secure mobile mail manager 710 includes personal information management ("PIM") applications such as a mail client, calendar, contacts, tasks, and notes synchronizing with corporate mail servers via the "Microsoft Exchange ActiveSync" ("EAS") protocol. Many applications such as "Oracle Business Intelligence" ("BI"), "Oracle Fusion Tap," "Oracle Social Network," "Oracle Enterprise Manager Cloud Control," "Oracle WebCenter Spaces," etc., and a broad range of third-party enterprise applications can be containerized with security container 706. All data at rest inside containerized applications 708 on mobile device 702 is encrypted. Encrypted data storage includes database, file store, cache, and user preferences. Security container 706 uses a secure channel such as an "AppTunnel" 714 (as described in U.S. Pat. No. 8,332,464, the disclosure of which is incorporated herein in its entirety) to communicate with corporate network 750 behind corporate DMZ 740. In one embodiment, data in transit through AppTunnel 714 is encrypted using TLS/SSL with Federal Information Processing Standard ("FIPS") approved algorithms.

In one embodiment, when a web browser or other client program makes an unauthenticated request to a security access server such as "Oracle Mobile Security Access Server" ("MSAS") from Oracle Corp., the security access server responds with a redirect to the appropriate security container. Security containers use a key hierarchy to protect data. All keys are derived from user credentials that are never stored. The key hierarchy involves multiple keys to support different sensitivity of data. For example, a unique key is used for the user's authentication certificate, which is allowed to be open for a very short period of time. A different key is used for the browser cache, which must remain decrypted for an entire session. The main security container distributes and manages keys for the complete set of apps in the user's secure enterprise workspace.

Secure container 706 has at least three distinctive benefits over conventional mobile virtual private network ("VPN") solutions: device trust vs. gateway, secure container password vs. device password, and secure container AppTunnel vs. device-level VPN. OMSS extends a network's Kerberos authentication trust directly to the user's device instead of stopping at a gateway server sitting in the DMZ. OMSS is significantly more efficient and secure than implementing "constrained delegation" offered by VPN providers. A constrained delegation solution is not only less secure but also more cumbersome to set up and maintain. Further, the tradeoff between usability and security is magnified when dealing with consumer devices and BYOD programs. Corporate IT requires strong passwords to protect corporate data on BYOD devices. Conversely, users want simple passwords—or preferably no device password at all—so they can easily access social networks and other consumer applications. Requiring a device password is frustrating for users, as they are constantly using the device for non-enterprise purposes that don't require enterprise authentication. Embodiments provide the necessary balance between security and usability when dealing with BYOD programs by requiring a password only to access corporate applications.

Yet further, device-level VPNs provide a trusted secure tunnel between a user's device and the enterprise's network. However, device-level VPN solutions are more appropriate for corporate-owned and secured endpoint devices such as laptops than for consumer mobile devices. Once a mobile-device VPN tunnel is open to the network, any application on a device has access to this secure tunnel, causing significant security vulnerability. With embodiments, however, the connection from mobile device 702 to enterprise intranet 750 exists only between security container 706 and enterprise servers.

In mobile security suite 700, MSAS 716 is typically deployed in corporate DMZ 740 and multiple server instances can be deployed behind a load balancer for high availability and scalability. MSAS 716 provides tunneled connections between the server and containerized apps 708. MSAS 716 brokers authentication (strong authentication leverages HTTPS connections to "Oracle Access Manager" ("OAM") 722 or Kerberos connections to Kerberos Domain Controllers 718), authorizes, audits, and enables SSO for, and proxies requests to, their destination (resources in corporate intranet 750 such as web applications and web services 724). MSAS 716 acts as the terminating end-point of the tunneled connections initiated by security container 706 and containerized applications 708.

MSAS 716 supports "Oracle API Gateway" ("OAG") from Oracle Corp. and OWSM from Oracle Corp. to add security, threat protection, and throttling policies to an organization's REST API infrastructure. SSO is supported through OAuth, OAM tokens, Kerberos, and NT LAN Manager ("NTLM"). SAML is supported through OAM 722 or Kerberos integration with SAML identity providers such as Oracle, CA, or Ping Identity. MSAS 716 is integrated with the OAM platform and supports the retrieval of OAM and OAuth tokens for SSO to backend resources protected by OAM, OAG, and OWSM. MSAS 716 also supports "virtual smart card" authentication by performing public key infrastructure ("PKI") authentication to Microsoft Active Directory protected by a PIN. Digital certificates are provisioned inside the security container app and only accessed after successful PIN validation. MSAS integration with OAM allows for context aware, risk based, step-up authentication.

Mobile security suite 700 further implements OWSM which is a component of the SOA Suite and addresses web-services-based SOA security and management. The purpose of a SOA infrastructure is to allow consumers to invoke services exposed by providers. OWSM offers a solution for policy management and security of such service infrastructure. It provides visibility and control of the policies through a centralized administration interface offered by "Oracle Enterprise Manager" from Oracle Corp. OWSM allows companies to (1) centrally define and store declarative policies applied to the multiple web services making up a SOA infrastructure, (2) locally enforce security and management policies through configurable agents, and (3) monitor runtime security events such as failed authentication or authorization. It also provides business agility to respond to security threats and security breaches by allowing policy changes to be enforced in real time without the need to interrupt the running business processes.

Mobile security suite 700 further implements "Oracle Mobile Security Manager" ("MSM") 720 within corporate network 750. MSM 720 is a "WebLogic" managed server running on either Oracle Linux or Red Hat Enterprise Linux. MSM 720 integrates with Microsoft Exchange Servers 728 in corporate network 750 to provide access to corporate email services. MSM 720 also integrates with LDAP servers 732 to provision users, assign and manage policies for Mobile Device Management and for accessing security container 706, manage the app catalog, control the remote lock or wipe of the device and secure workspace apps (wiping security container 706 removes all data and configuration for workspace apps), and set access control policies for the security container. Policies are assigned to users by associating policy templates with users and user groups. Available policy controls include device restrictions, authentication (authentication frequency, failed attempt threshold, PIN strength for PKI), catalog (apps, URLs, file shares), container/apps (compromised platform, location services, offline status, inactivity duration, data leak prevention ("DLP")), time access (lock if outside time window), Geo Access (lock if outside geo-fence (city, state, country)), devices (whitelist specific device models, specify minimum OS level), browser (disable address bar, disable download), file browser (allow/disallow, disable download, specify file server URL), personal information manager ("PIM," mail server URL), provisioning (invite template, PKI details), etc. If a user is in multiple groups and has multiple policies, policy combinations are resolved following specific rules.

MSM 720 maintains the EMM policies, which are then associated to one or more user groups in the directory. MSM 720 does not perform any user or group management but leverages these identities and groups directly (no synchronization) from the directory store. MSM 720 uses APNS and CGN over HTTPS to send notifications to devices. MSM 720 also exposes a WebDAV front-end to internal CIFS/SMB-enabled File Systems 730 or "Microsoft SharePoint servers," and enables browsing intranet file shares from the client.

With more and more organizations establishing a presence on social networks, IT departments need support for social identities, which rely on more lightweight security standards than enterprise identities but are better adapted to the requirements of social networks. For example, some websites may require users to provide access tokens obtained from Facebook or Google in order to be authenticated to their services. Accordingly, Mobile security suite 700 further implements OAMMS that includes a server that interfaces with existing backend identity management infrastructures. The server acts as an intermediary between supported mobile client apps and backend identity services. This decouples the client apps from the backend infrastructure so that backend infrastructure can be modified without having to update mobile client programs. OAMMS includes the following functionality:

Delegated authorization leveraging the OAuth standard.

Mobile Services connecting browser-based (HTML5) and native mobile apps to the enterprise identity management infrastructure, typically the "Oracle Access Management platform."

Internet Identity Services that let OAMMS be used as the relying party when interacting with popular, cloud-based identity authentication and authorization services such as Google, Yahoo, Facebook, Twitter, or LinkedIn. By deploying OAMMS, the user is provided with multiple login options without the need to implement access functionality for each identity provider individually. User Profile Services providing a REST interface for LDAP CRUD operations (customers use the same REST interface to build graphical UIs for apps), user self service functions such as self-registration, profile maintenance, password management, and account deletion. User Profile Services are also available as an OAuth resource.

Access Management Integration Services for leveraging OAM 722 through a runtime REST interface provided by an agent SDK.

Figure 8:
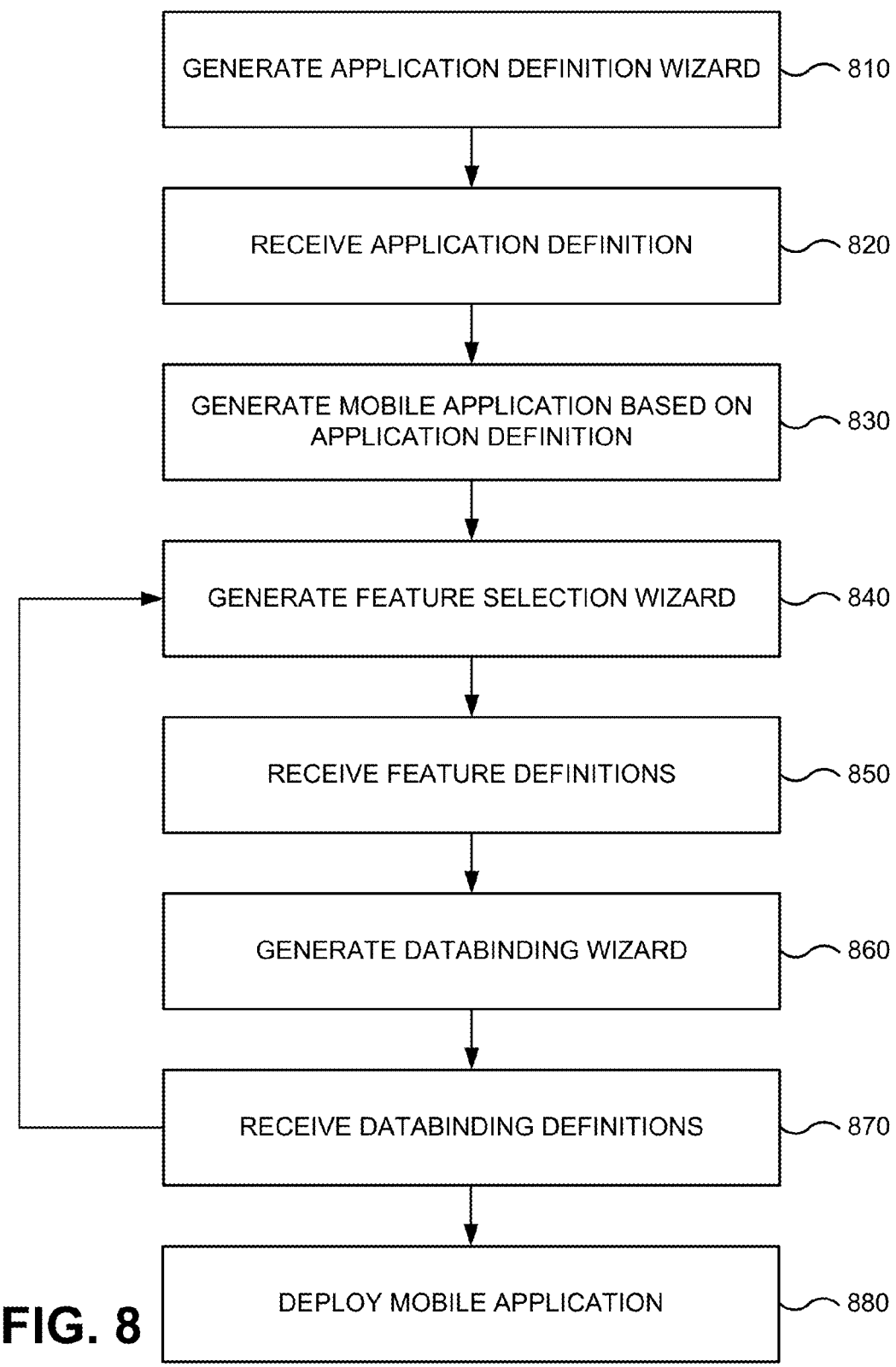
FIG. 8 is a flow diagram of mobile application development in accordance with embodiments of the present invention.

FIG. 8 is a flow diagram of mobile application development in accordance with embodiments of the present invention. In one embodiment, the functionality of the flow diagram of FIG. 8 (and FIG. 10 described below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. An example of cloud based mobile application development is provided in U.S. Provisional App. No. 62/186,080, filed Jun. 29, 2015, entitled "CLOUD BASED EDITOR FOR GENERATION OF INTERPRETED ARTIFACTS FOR MOBILE RUN-TIME," the disclosure of which is hereby incorporated by reference.

At 810 an application definition wizard is generated. An application definition wizard as used herein represents a set of one or more UIs that guide a user during the definition process of a mobile application that utilizes one or more pre-defined cloud-accessible services. The application definition wizard can implement one or more workflows each associated with a part of the application definition process. In one embodiment, the application definition wizard can prompt or otherwise guide a user to specify application defaults, such as application identifier prefixes, default icons, splash screens, default application/feature templates, setup enterprise provisioning profile/keystore, or the like.

In certain embodiments, the application definition wizard can prompt or otherwise guide a user to specify an application name, a form factor (such as a phone or tablet device), a navigation type (e.g., none meaning a single feature or UI, as springboard, a navigation bar ("NavBar"), a Spring/Nav combo, or the like), and any application preferences.

At 820 an application definition is received. As discussed herein, the application definition can include any information needed in order to create at least a minimally functional mobile application. At 830 a mobile application is generated based on the application definition. In one embodiment, the mobile application is represented in a simulator of the target device and can include a set of definitions that when interpreted, function as a compiled mobile application.

At 840 a feature selection wizard is generated. A feature selection wizard as used herein represents a set of one or more UIs that guide a user during the development process of a mobile application that utilizes one or more pre-defined cloud-accessible services. The feature selection wizard can implement one or more workflows each associated with a part of the application development process. In one embodiment, the feature selection wizard can prompt or otherwise guide a user to specify features, UI modules, Business Object, or the like that can be used with the mobile application.

In certain embodiments, the feature selection wizard can prompt or otherwise guide a user to specify components of the first screen of the mobile application. A component can be selected from a catalog of components.

In certain embodiments, the feature selection wizard can prompt or otherwise guide a user to specify components of other screens of the mobile application. These other screens can form part of one or more UI modules. In certain embodiments, the feature selection wizard can prompt or otherwise guide a user to specify one or more UI modules of the mobile application. A UI module represents a processor, task, or flow that can be performed with respect to the mobile application. A UI module can be selected from a catalog of UI modules or a set of templates that provide cohesive collections of UI elements and page flows. Some examples of UI modules are approval workflows, worker tasks, data entry tasks, reports builders, or the like. A template provides a pre-set arrangement/binding of a set of UI elements so that a user only needs to configure those UI elements and bind the template instead of having to arrange and bind individual UI elements. In one embodiment, a user may contribute their own templates to the set of templates available to another user. The user can configure or otherwise specify a series of pages that represent the UI Module. For each page, the user can be presented with a set of layout templates much like before. Each layout template might have several facets such as choosing a secondary template.

In some embodiments, the feature selection wizard can prompt or otherwise guide a user to specify additional features of the mobile application, such as business objects previously defined. The user can specify what resource of the backend service, API, or connector is to be used or otherwise associated with UI elements of each component, screen, UI module, or the like.

At 850 feature definitions are received, and at 860 a data binding wizard is generated. A data binding wizard as used herein represents a set of one or more UIs or UI elements of an existing UI that guide a user during the data binding process of a mobile application that utilizes one or more pre-defined cloud-accessible services. The data binding wizard can implement one or more workflows each associated with a part of the application development process. In one embodiment, the data binding wizard can prompt or otherwise guide a user to specify how features, screens, UI modules, etc., are bound to business objects, services, APIs, or the like that can be used with the mobile application. In certain embodiments, the data binding wizard can prompt or otherwise guide a user to specify a business object of the mobile application. A business object can be selected from a catalog or set of services, APIs, etc. that are available to the mobile application.

At 870 data binding definitions are received. In various embodiments, steps 840-870 can be performed in series or in parallel. Individual steps in 840-870 can be performed on individual element of a mobile application or to a group of elements. As illustrated, a user can repeat the process of feature definition and data binding to create a mobile application.

At 880 the mobile application is deployed. The user can test the application using a testing application deployed on a target device, or as a native application deployed on a target device.

Discovery of Federated Logins

In some current cloud systems, there is a different login server for each company that subscribes to a cloud service. That is, each company has a unique login server attached to their service, and employees of each company need to log into their corresponding login server. Accordingly, discovery of the appropriate login server and logging into it is required prior to interacting with a cloud service.

Some known systems provide applications that require the user to type in the URL of the unique login server that needs to be logged into. An example of such applications is Oracle CRM from Oracle Corp. However, requiring the user to type in this URL is error prone. Further, such requirement may result in an unpleasant user experience.

Some known systems provide applications that determine their corresponding unique login server based on a user company email address. For example, for a user company email address of "user@acme.com," the corresponding unique login server may be mapped to "acme.mycloudservice.com." An example of such applications is WebEx from Cisco Corp. Determining the unique login server based on a company email address may be performed by accessing a centralized repository that provides a mapping between company emails and corresponding unique login servers. However, having such a centralized repository may not always be possible in a cloud system, for example, when a cloud backend does not allow federation of user credentials in SSO systems and/or when security is internal only and the cloud system is not able to authenticate with third party sources.

Some known systems install a provisioning profile on a mobile device so that the provisioning profile can then tell the other applications how to locate services for the mobile device. A provisioning profile includes a set of metadata that an application can use to determine default services. For example, a provisioning profile may include the link to a login server as part of the metadata. In these known systems, the user needs to download and install the provisioning profile (which may be distributed by their company). However, many customers do not wish to install company profiles, especially on personal devices. Further, these provisioning profiles need to be sent to users as a separate process.

Some known systems integrate with SSO which provides access control of multiple related but independent software systems. SSO is a form of federated identity management which pertains to the implementation of a common set of policies, practices, and protocols to manage electronic identity and trustworthiness of users and devices across organizations. These known systems need to have a priori knowledge of a number of companies so that a user can specify one of those companies to sign on. However, not every system is integrated with SSO, for example, due to limitations of the cloud backend.

In contrast to the known systems, embodiments provide federated login discovery functionality at the same time as downloading resources to a user device. In one embodiment, the unique login server of a company is automatically discovered as the user follows a download link. The user is then asked to login and the resource is subsequently downloaded to the mobile device of the user. Embodiments do not require any special setup on cloud service authentication systems, thus allowing for working with any identity store for security. Further, embodiments do not require a user to type in the address of a login server or use a separate discovery service to login, and the functionality of a federated login is hidden from the user. Accordingly, embodiments improve user experience. Embodiments are applicable to any corporate native applications that require a user to identify their company.

In one embodiment, a user receives a download link from a service to download a resource. An example of such resource is the metadata that describes an application developed via a web-based framework. The download link may be received via any communication or networking means, e.g., email, text message, social networks, etc. If the user follows the download link from a desktop browser, they are presented with a QR code that they can scan with their mobile device. Alternatively, if the user is on a mobile device and follows the download link, they are presented with a button to download the content. After scanning the QR code or clicking the button (depending on how the user opened the link), the user is asked for login credentials. The resource is then downloaded and can be forwarded to an application on the user device.

In one embodiment, the link that is sent to the user includes a specific company service URL which is unprotected (i.e., no login is required to follow the company service URL) and includes an ID or locator of the resource the user wishes to download. An example of such URL is:

max://?loginHost=server.oraclecloud.com&app=appId where the "loginHost" parameter describes the server host to connect to. If the user follows the company service URL from a non-mobile device (e.g., a desktop computer), the user is presented with a screen that includes some information about the resource as well as a QR code. The user can then download the content by scanning the QR code using a scanning application on a mobile device. Alternatively or additionally, QR scanning functionality can be built into applications that are configured to receive the downloaded content.

The same company service URL is also provided to a user to follow from a mobile device, but the screen that is provided on the mobile device upon following the company service URL includes some information about the resource, and a download button instead of a QR code. Although the same URL is provided to users of mobile and non-mobile devices, embodiments detect if the user is using a mobile device or a non-mobile device and provide respective content accordingly.

In one embodiment, the link for the company service URL as configured to be opened on both mobile and non-mobile devices is encoded in a URI schema. A URI schema is a mechanism to trigger actions upon clicking on a link. In one embodiment, the URI schema allows native applications to intercept a request (e.g., the request corresponding to clicking on a link). The content encoded in this schema includes the login server address and the address of the downloadable content, where the downloadable content is protected by login functionality and cannot be accessed directly. Upon following a tokenized URL that implements the URI schema, the receiving application (the application that intercepts the request from the URI schema) identifies the login server from the encoded information in the URI schema, lets the user login, and then downloads/installs the new application.

In one embodiment, when an address entered in a web browser running on a mobile device includes embedded tokens indicating an application developed by a web-based framework (e.g., by Oracle MAF), its login information, application download location information, backends used by the application, etc., the corresponding URI schema is configured to ensure that these tokens are obtained by the OS of the mobile device and forwarded to an application on the device that is configured to receive the downloaded content.

An example of such URL is:

max://?loginHost=server.oraclecloud.com&backendId=someBackendId&app=someAppId which includes the embedded tokens of "loginHost=server.oraclecloud.com" (indicating login server information), "backendId=someBackendId" (indicating backend information), and "app=someAppId" (indicating application information). In this example, a mobile application can intercept URLs with "max" as their schema (e.g., the first part of the URL) and forward them to an application that is configured to handle these URL and extract the embedded tokens.

Figure 9:
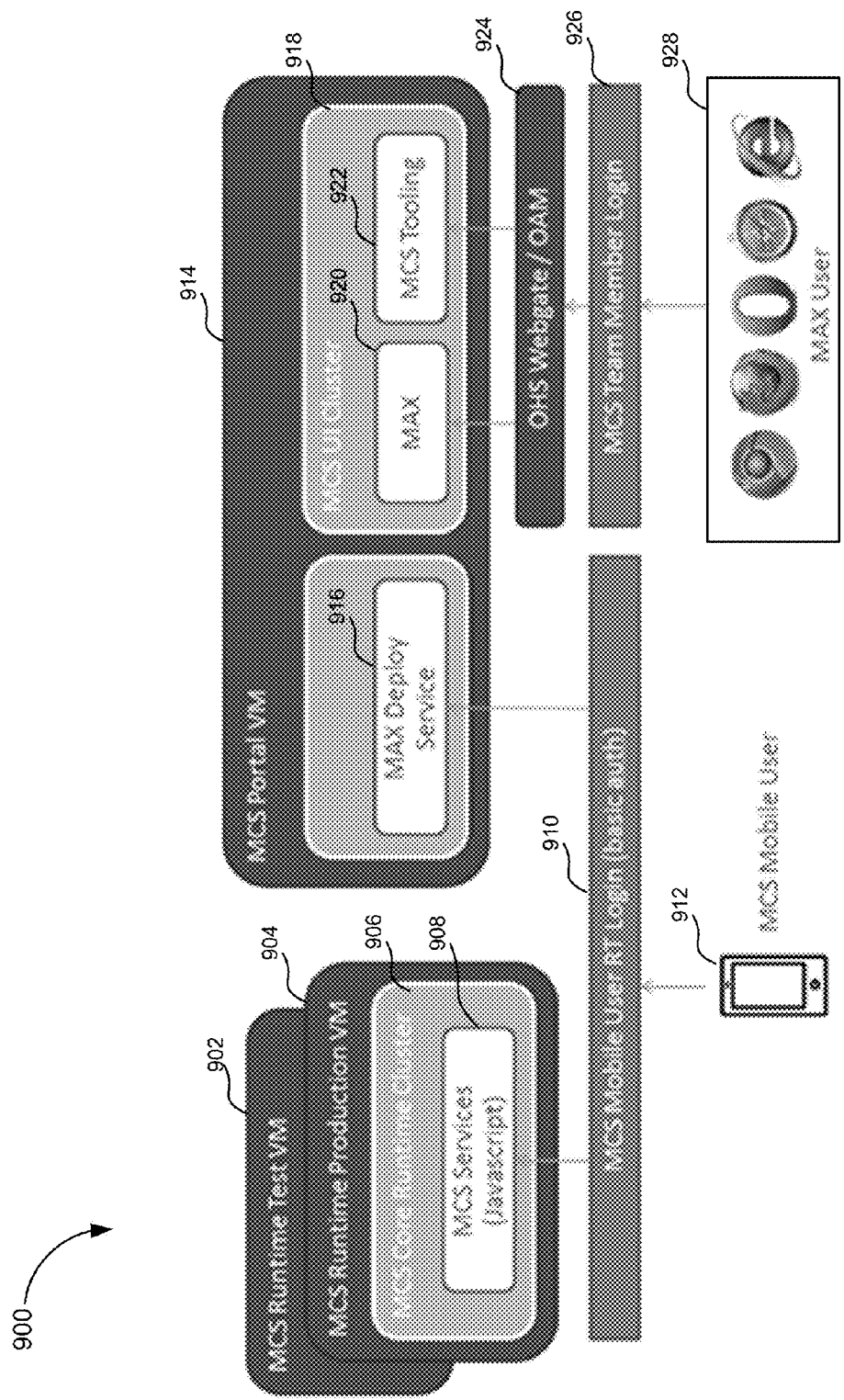
FIG. 9 is an example application network topology for web based application development in accordance with embodiments of the present invention.

FIG. 9 is an example application network topology 900 for web-based application development in one embodiment. This embodiment provides native application development functionality that is applicable to use cases such as running "published" applications, sharing applications built in a web-based framework with other mobile users who may not have an account in the web-based framework, deploying applications for companies that do not wish to share enterprise keys (where keys are required for a full build service), etc. In this embodiment, a hosting application on a user device 912 allows a user to download hosted applications (built in the web-based framework) as added features to the hosting application. The hosting application may be downloaded on user device 912 from, e.g., AppStore, Google play, etc. The hosted applications are lightweight and do not require building native artifacts, thus providing an alternative to using a build server farm.

Application network topology 900 implements MCS "team member" login functionality 926 which provides cookie-based login for users 928 that develop applications. After logging in, users 928 may develop applications by communicating with an MCS portal virtual machine 914 through OHS WebGate 924 (the web-server plug-in for Oracle Access Manager ("OAM") to intercept HTTP requests and forward them to an access server for authentication and authorization).

An authentication cookie is an item in a dictionary of items each having a key (e.g., "username") and a value (e.g., an instance of a username such as "bob123"). When a browser sends a request to a website, automatic authentication can be performed by including authentication cookies in the request so the cookies can be checked by a host server. A cookie may be set by adding it to the response the server sends back to the requesting browser which then adds (saves) the cookie upon receiving the response. Thereafter the browser adds the cookies in the HTTP header of every request made to that server.

In one embodiment, MCS portal virtual machine 914 includes an MCS UI cluster 918 that in turn includes a UI server 920 of the web-based framework and MCS tooling functionality 922. In this embodiment, users 928 can use MCS tooling functionality 922 to select a cloud or other connector to a backend system of interest and then develop an application. The mobile backends that support the application may run on an MCS runtime test virtual machine 902 in a runtime test environment or an MCS runtime production virtual machine 904 in a runtime production environment. The runtime production virtual machine 904 may include JavaScript MCS services 908 accessible via an MCS core runtime cluster 906.

Application network topology 900 further implements MCS mobile user runtime login functionality 910 which allows the hosting application on user device 912 to log into MCS as a mobile user. The hosted applications can then use MCS mobile user basic access authentication (or "basic auth," a method for an HTTP user agent to provide a username and password when making a request). In one embodiment, the logins are stored indefinitely on mobile device 912 and shared across the hosted applications.

In one embodiment, when an application is developed in application network topology 900, UI server 920 of the web-based framework hosts the HTML page that is generated for the developed application. The HTML page includes a QR code that points to one of the environments (e.g., test/production) which communicates with UI server 920 to obtain and cache application data. Once this data is cached on one of the environments, it can be provided to users (e.g., mobile device 912) by that environment without needing to obtain it again from UI server 920. In one embodiment, the QR code will only show up on desktop browsers, and if a mobile user looks at the same page, they will instead see an "Install" button that when clicked will follow the same URL as encoded in the QR code. Accordingly, by allowing for obtaining application data from one of the environments instead of accessing UI server 912, embodiments prevent the situation where a large number of users access UI server 912. In one embodiment, a download service 916 within MCS portal virtual machine 914 serves and stores application data and allows for lightweight declarative metadata to be downloaded onto mobile device 912. This metadata is the application metadata and can be run in the host application by having the host application interpret and execute the metadata. In one embodiment, an application download service can be used in a test environment for application testing and in a production environment for application production.

Accordingly, the information that is sent down to mobile device 912 for installing a hosted application is declarative data that gets interpreted on mobile device 912 during runtime, and binary files of the hosting application include the codes necessary for running the hosted application. The hosted applications also share the same login. For example, within a same hosting application, a hosted application for enterprise HR functionality and another hosted application attached to the CRM of the enterprise may share the same login. In one embodiment, once a new hosted application is downloaded, a corresponding icon is added to a springboard of the hosting application on mobile device 912. The new hosted application can then be modified, upgraded, and/or uninstalled independently of other hosted applications within the hosting application.

In one embodiment, the URL encoded by the QR code or linked from the download button (depending on whether being viewed from a desktop browser or a mobile device) includes the login server information. Accordingly, embodiments do not attempt to login a user at the time of starting an application (since required login information is not available at that time), but instead attempt to login the user at the first time the application is downloaded (e.g., via a QR code or a download button), which is when the login server information is available.

Figure 10:
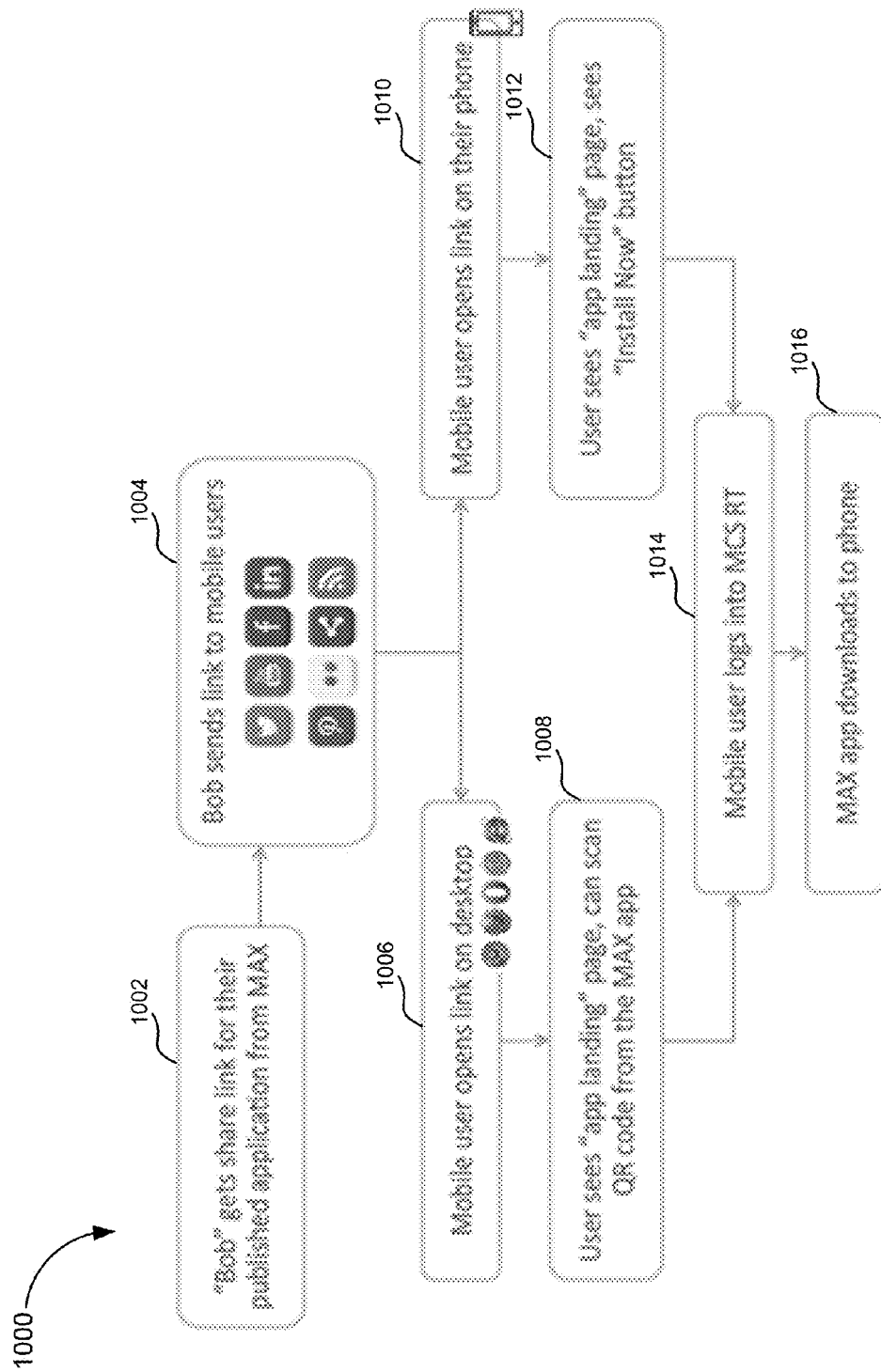
FIG. 10 is an example application sharing flow in accordance with embodiments of the present invention.

FIG. 10 is an example application sharing flow 1000 in one embodiment. At 1002 a user "Bob" that develops an application and wishes to publish it gets a "share" link from a web-based framework for the published application. The user may be provided with this share link in a screen that includes a list of several applications. Each application in the list may be presented as a "card" which can be flipped over to reveal a QR code for the application. The card may also include a share button, and upon clicking on the share button, a link is provided for sharing the application.

At 1004 the user sends the share link to prospective mobile users of the application. The share link may be shared with mobile users via any networking, communication, or sharing service such as social networks, email, instant message, etc. In one embodiment, the share link is not a link to the application but a link to an HTML page which includes information related to the application. This information may include, for example, screens/previews of the application, application information, instructions for using the application, a QR code for launching the application (if the link is reached via a non-mobile device), an "install" button for launching the application (if the link is reached by a mobile device), etc. Accordingly, users that receive the link may use it to download the application created in the web-based framework. This application is secured with MCS "mobile user" credentials. However, the users do not need to know the domain of the MCS server, since both login and application download links are included/encoded within the share link.

If a mobile user receives the share link and opens it on a non-mobile device (e.g., a desktop computer) at 1006, at 1008 the user sees an application landing page including a QR code that can be scanned by a mobile device. Upon scanning the QR code, at 1014 the information encoded in the share link is used to log in the mobile user into MCS runtime, and at 1016 the application is downloaded to the mobile device that scanned the QR code.

If a mobile user receives the share link and opens it on a mobile device (e.g., a mobile phone) at 1010, at 1012 the user sees an application landing page including a button for installing the application. Upon clicking the button on the mobile device, at 1014 the information encoded in the share link is used to log in the mobile user into MCS runtime, and at 1016 the application is downloaded to the mobile device.

Figure 11:
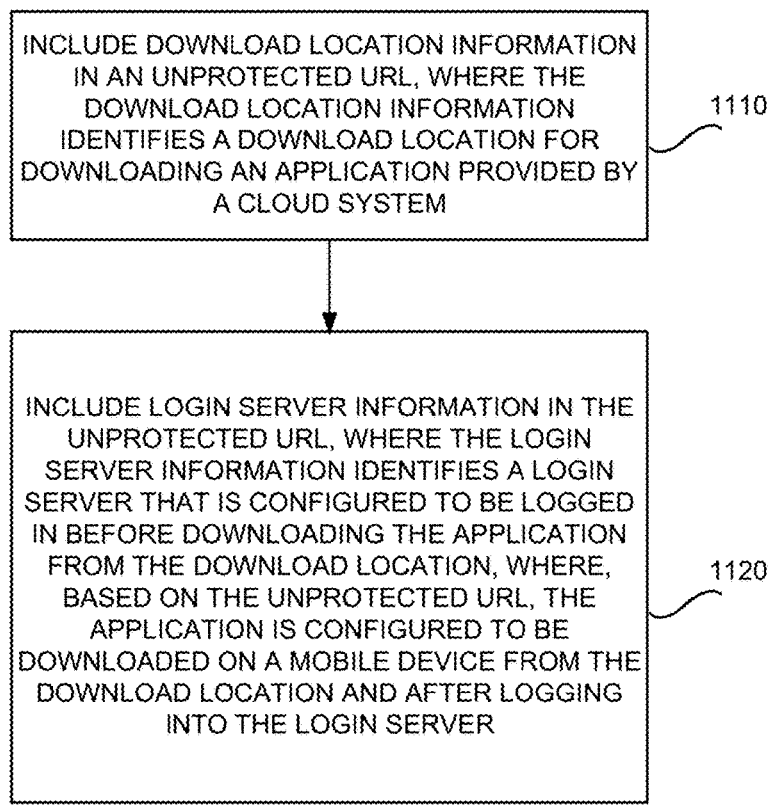
FIG. 11 is a flow diagram of federated login discovery functionality in accordance with embodiments of the present invention.

FIG. 11 is a flow diagram of federated login discovery functionality in accordance with embodiments of the present invention.

At 1110 download location information is included in an unprotected URL, where the download location information identifies a download location for downloading an application provided by a cloud system.

At 1120 login server information is included in the unprotected URL, where the login server information identifies a login server that is configured to be logged in before downloading the application from the download location. In one embodiment, based on the unprotected URL, the application is downloaded on a mobile device from the download location and after logging into the login server.

In one embodiment, the application may be developed by accessing a web-based application development server in the cloud system. After the application is developed, the web-based application development server generates the unprotected URL.

In one embodiment, the unprotected URL is shared with one or more devices for downloading the application. The one or more devices may include a non-mobile device, and following the unprotected URL on the non-mobile device opens a web page that includes download information for the application. The web page includes a QR code that encodes the application and the login information, and the application is downloaded to the mobile device that scans the QR code.

In one embodiment, the one or more devices includes the mobile device, and following the unprotected URL on the mobile device opens a web page that includes download information for the application. The web page includes a download button for downloading the application, and clicking the download button downloads the application to the mobile device.

In one embodiment, the unprotected URL is a tokenized URL that includes tokens for at least one of an application link, application login information, application download information, and a mobile backend used by the application.

In one embodiment, logging into the login server includes authenticating a device based on user credentials provided through the device, and the application is installed on the device when the device is authenticated. In one embodiment, the device includes a hosting application, and the application is installed as a feature of the hosting application.

In one embodiment, installing the application is performed by downloading declarative metadata of the application to the device, and the declarative metadata of the application is interpreted at runtime. In one embodiment, the application shares login information with other applications that are installed as features of the hosting application. In one embodiment, each application that is added as a feature of the hosting application is configured to be independently modified.

As disclosed, embodiments provide login discovery functionality for downloading an application. In one embodiment, login server information is encoded within a tokenized URL that is provided to a user for downloading an application. Upon following the URL, the embodiment logs into the appropriate log in server and downloads the application. Accordingly, by simplifying login discovery and hiding it from the user, embodiments improve user experience. Further, embodiments do not require any special setup on cloud service authentication systems, thus allowing for working with any identity store for security.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed:

1. A non-transitory computer readable medium having instructions stored thereon that, when executed by a processor, cause the processor to:
   identify a download location for downloading an application provided by a cloud system that comprises a plurality of tenants and a plurality of login servers, where a login server corresponds to each of the tenants;
   identify a first login server, corresponding to a first tenant of the plurality of tenants, that is configured to be logged in before downloading the application from the download location;
   identify a second login server, corresponding to a second tenant of the plurality of tenants, that is configured to be logged in before downloading the application from the download location;
   generate a first unprotected Uniform Resource Locator (URL) that comprises an identity of the download location and an identity of the first login server;
   provide the first unprotected URL to a first mobile device, wherein, based on the first unprotected URL, the application is configured to be downloaded on the first mobile device from the download location and after logging into the first login server to authenticate the first mobile device;
   generate a second unprotected URL that comprises the identity of the download location and an identity of the second login server;
   provide the second unprotected URL to a second mobile device, wherein, based on the second unprotected URL, the application is configured to be downloaded on the second mobile device from the download location and after logging into the second login server to authenticate the second mobile device;
   wherein the download location comprises a corresponding first address and the first login server comprises a corresponding second address that is different from the first address and the second login server comprises a corresponding third address that is different from the first address and the second address;
   wherein the first mobile device is associated with the first tenant of the plurality of tenants and the second mobile device is associated with the second tenant of the plurality of tenants;
   wherein the first login server and second address correspond to only one of the tenants, and the application is available to the plurality of tenants.

2. The computer readable medium of claim 1, wherein the application is developed by accessing a web-based application development server in the cloud system.

3. The computer readable medium of claim 2, wherein, after the application is developed, the web-based application development server generates the first unprotected URL.

4. The computer readable medium of claim 3, wherein the first unprotected URL is shared with one or more devices for downloading the application.

5. The computer readable medium of claim 4, wherein the one or more devices include a non-mobile device, wherein following the first unprotected URL on the non-mobile device opens a web page that includes download information for the application.

6. The computer readable medium of claim 5, wherein the web page includes a Quick Response (QR) code that encodes the application and the identity of the first login server, wherein the application is downloaded to the first mobile device that scans the QR code.

7. The computer readable medium of claim 4, wherein the one or more devices includes the first mobile device, wherein following the first unprotected URL on the first mobile device opens a web page that includes download information for the application.

8. The computer readable medium of claim 7, wherein the web page includes a download button for downloading the application, wherein clicking the download button downloads the application to the first mobile device.

9. The computer readable medium of claim 1, wherein the first unprotected URL is a tokenized URL that includes tokens for at least one of an application link, application login information, application download information, and a mobile backend used by the application.

10. The computer readable medium of claim 1, wherein the application is installed on the first mobile device.

11. The computer readable medium of claim 10, wherein the first mobile device includes a hosting application, wherein the application is installed as a feature of the hosting application.

12. The computer readable medium of claim 11, wherein installing the application is performed by downloading declarative metadata of the application to the first mobile device.

13. A method comprising:
identifying a download location for downloading an application provided by a cloud system that comprises a plurality of tenants and a plurality of login servers, where a login server corresponds to each of the tenants;
identifying a first login server, corresponding to a first tenant of the plurality of tenants, that is configured to be logged in before downloading the application from the download location;
identifying a second login server, corresponding to a second tenant of the plurality of tenants, that is configured to be logged in before downloading the application from the download location;
generating a first unprotected Uniform Resource Locator (URL) that comprises an identity of the download location and an identity of the first login server;
providing the first unprotected URL to a first mobile device, wherein, based on the first unprotected URL, the application is configured to be downloaded on the first mobile device from the download location and after logging into the first login server to authenticate the first mobile device;
generating a second unprotected URL that comprises the identity of the download location and an identity of the second login server;
providing the second unprotected URL to a second mobile device, wherein, based on the second unprotected URL, the application is configured to be downloaded on the second mobile device from the download location and after logging into the second login server to authenticate the second mobile device;
wherein the download location comprises a corresponding first address and the first login server comprises a corresponding second address that is different from the first address and the second login server comprises a corresponding third address that is different from the first address and the second address;
wherein the first mobile device is associated with the first tenant of the plurality of tenants and the second mobile device is associated with the second tenant of the plurality of tenants;
wherein the first login server and second address correspond to only one of the tenants, and the application is available to the plurality of tenants.

14. The method of claim 13, wherein the application is developed by accessing a web-based application development server in the cloud system.

15. The method of claim 14, wherein, after the application is developed, the web-based application development server generates the first unprotected URL.

16. A cloud based system comprising:
a plurality of login servers a plurality of tenants; and
one or more processors that execute instructions to implement application download functionality comprising:
identifying a download location for downloading an application provided by the cloud based system, where a login server corresponds to each of the tenants;
identifying a first login server, corresponding to a first tenant of the plurality of tenants, that is configured to be logged in before downloading the application from the download location;
identifying a second login server, corresponding to a second tenant of the plurality of tenants, that is configured to be logged in before downloading the application from the download location;
generating a first unprotected Uniform Resource Locator (URL) that comprises an identity of the download location and an identity of the first login server;
providing the first unprotected URL to a first mobile device, wherein, based on the first unprotected URL, the application is configured to be downloaded on the first mobile device from the download location and after logging into the first login server to authenticate the first mobile device;
generating a second unprotected URL that comprises the identity of the download location and an identity of the second login server;
providing the second unprotected URL to a second mobile device, wherein, based on the second unprotected URL, the application is configured to be downloaded on the second mobile device from the download location and after logging into the second login server to authenticate the second mobile device;
wherein the download location comprises a corresponding first address and the first login server comprises a corresponding second address that is different from the first address and the second login server comprises a corresponding third address that is different from the first address and the second address;
wherein the first mobile device is associated with the first tenant of the plurality of tenants and the second mobile device is associated with the second tenant of the plurality of tenants;
wherein the first login server and second address correspond to only one of the tenants, and the application is available to the plurality of tenants.

17. The method of claim 13, wherein the first unprotected URL is shared with one or more devices for downloading the application and the one or more devices include a non-mobile device, wherein following the first unprotected URL on the non-mobile device opens a web page that includes download information for the application and the web page includes a Quick Response (QR) code that encodes the application and the identity of the first login server.

18. The system of claim 16, wherein the first unprotected URL is shared with one or more devices for downloading the application and the one or more devices include a non-mobile device, wherein following the first unprotected URL on the non-mobile device opens a web page that includes download information for the application and the web page includes a Quick Response (QR) code that encodes the application and the identity of the first login server.

19. The system of claim 16, wherein the application is developed by accessing a web-based application development server in the cloud based system and after the application is developed, the web-based application development server generates the first unprotected URL.

20. The method of claim 13, wherein the first unprotected URL is a tokenized URL that includes tokens for at least one of an application link, application login information, application download information, and a mobile backend used by the application.

* * * * *